United States Patent
Arngren et al.

(10) Patent No.: US 11,956,634 B2
(45) Date of Patent: Apr. 9, 2024

(54) TRUSTED SOLUTIONS FOR ENABLING USER EQUIPMENT BELONGING TO A HOME NETWORK TO ACCESS DATA COMMUNICATION SERVICES IN A VISITED NETWORK

(71) Applicant: TELEFONAKTIEBOLAGET LM ERICSSON (PUBL), Stockholm (SE)

(72) Inventors: Tommy Arngren, Södra Sunderbyn (SE); Bernard Smeets, Dalby (SE); Tomas Thyni, Järfälla (SE); Daniel Bergström, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 186 days.

(21) Appl. No.: 17/606,335

(22) PCT Filed: Apr. 25, 2019

(86) PCT No.: PCT/EP2019/060650
§ 371 (c)(1),
(2) Date: Oct. 25, 2021

(87) PCT Pub. No.: WO2020/216445
PCT Pub. Date: Oct. 29, 2020

(65) Prior Publication Data
US 2022/0191697 A1  Jun. 16, 2022

(51) Int. Cl.
*H04L 29/00* (2006.01)
*H04W 12/084* (2021.01)

(52) U.S. Cl.
CPC ................................. *H04W 12/084* (2021.01)

(58) Field of Classification Search
CPC .................................................. H04W 12/084
(Continued)

(56) References Cited

U.S. PATENT DOCUMENTS 8,533,803 B2 * 9/2013 Cha ..................... H04W 12/069
726/8
9,819,596 B2 11/2017 Lee et al.
(Continued)

OTHER PUBLICATIONS

Ericsson, "Discussion and pCR for inter-PLMN token-based authorization", 3GPP TSG SA WG3 (Security) Meeting #90bis, S3-180715, Feb. 26-Mar. 2, 2018, San Diego, US.
(Continued)

*Primary Examiner* — Brandon Hoffman
*Assistant Examiner* — Michael D Anderson
(74) *Attorney, Agent, or Firm* — WEISBERG I.P. LAW, P.A.

(57) ABSTRACT

The application discloses methods and corresponding systems and network devices and/or nodes for enabling user equipment belonging to a home network to access data communication services in a visited network of a wireless communication system. By way of example, there is provided a method that comprises the step of obtaining at least one cryptographic token originating from a network node of the home network of the user equipment and cryptographically signed by a private key associated with the home network, wherein the at least one cryptographic token represents means for accessing data communication services via user data transport functions of the visited network. The method also comprises cryptographically signing the obtained and signed token by a private key associated with the user equipment to generate a double-signed token, and sending the double-signed token to a network node of the visited network, which validates the double-signed token for enabling the user equipment to access data communication services via the user data transport functions of the visited network.

21 Claims, 25 Drawing Sheets

(58) Field of Classification Search
USPC .............................................................. 726/2
See application file for complete search history.

(56) References Cited

U.S. PATENT DOCUMENTS

| | | | |
|---|---|---|---|
| 2009/0282251 A1* | 11/2009 | Cook | ..................... H04L 63/18 |
| | | | 713/171 |
| 2009/0291666 A1 | 11/2009 | Rydnell et al. | |
| 2013/0047218 A1 | 2/2013 | Smith | |

OTHER PUBLICATIONS

Huawei et al., "Clarification on service authorization and token verification", 3GPP TSG-SA WG3 Meeting #94, 83-190440, Jan. 28-Feb. 1, 2019, Kochi, India.

* cited by examiner

TRUSTED SOLUTIONS FOR ENABLING USER EQUIPMENT BELONGING TO A HOME NETWORK TO ACCESS DATA COMMUNICATION SERVICES IN A VISITED NETWORK

PRIORITY CLAIM

This application is a national stage application of International Patent Application No. PCT/EP2019/060650, filed Apr. 25, 2020, the disclosure disclosures of which are hereby incorporated in their entirety by reference.

TECHNICAL FIELD

The proposed technology generally relates to communications technology, and more specifically to a set of individual methods for enabling user equipment belonging to a home network to access data communication services in a visited network, and corresponding user equipment, systems and network devices as well as corresponding computer programs and computer-program products.

BACKGROUND

Communication systems such as wireless systems are constantly evolving and intense research and development take place all over the world, for improved performance, quality and/or security.

Mobility and the need for uninterrupted services when moving or traveling is of outmost importance. In this context, roaming between different wireless networks, of the same or different types, is critical for allowing a user travelling outside the geographical coverage area of its home network to be able to continuously access communication services in one or more visited networks.

FIG. 1A is a schematic diagram illustrating an example of an overall wireless communication environment providing a context for roaming between different wireless networks, such as a home PLMN and a visited PLMN, where PLMN stands for Public Land Mobile Network as a combination of wireless communication services offered by a specific operator. This particular example relates to 4G or similar networks.

For simplicity, the terms Home Network Operator, HNO, and Visited Network Operator, VNO, will be used for the home network operator and the visited network operator, respectively. Only relevant parts of the networks are illustrated in FIG. 1A, including the radio access network part, such as Evolved UMTS Terrestrial Radio Access Network, E-UTRAN, Serving Gateway, S-GW, Packet Data Network, PDN, Gateway and the Mobility Management Entity, MME, of the visited network, and the Home Subscriber Server, HSS, and the P-GW of the home network.

Today, when connected to a VNO, different from the user's normal HNO, the data traffic sent and requested by the user/client is routed through the VNO via the Serving Gateway, S-GW, back to the HNO and then communicated via the PDN Gateway, P-GW, out onto the internet, as can be seen by the bold black line in FIG. 1A. This causes extra network load and irrational network delays, especially when accessing Internet resources local to the visited country.

Local Breakout, LBO, is a mechanism where the network data does not have to be sent back through the HNO. Instead, the traffic may be directly routed via the S-GW out onto the Internet through the P-GW of the VNO, as can be seen by the bold gray line in FIG. 1A. This allows reduced network load and improved latency.

As a general mechanism, Local Breakout is already part of standardization today, but have not gained widespread use. One of the main reasons why Local Breakout is not being used is because of trust issues. For example, the HNO needs to trust the VNO when it comes to redemption and clearing of communication services. In addition, the end user and the HNO needs to trust the measurements of the VNO regarding the data compensation, which in turn is used as the basis for charging and billing between the HNO and the user.

FIG. 1B is a schematic diagram illustrating another example of an overall wireless communication environment providing a context for roaming between different wireless networks. The particular example of FIG. 1B relates to 5G, and the visited network and the home network has similar units and functions corresponding to those shown in the example of FIG. 1A.

Access and Mobility Management Function (AMF) has the mobility management part (MME in 4G) and has the NAS signaling connection with the UE.

Session Management Function (SMF) provides the session management functionality (MME in 4G) and some control plane functions for the UPF (S-GW and P-GW control plane in 4G). The SMF also allocates IP addresses to the UE.

The Unified Data Management (UDM) entity generates authentication vectors (part of HSS in 4G).

The User Plane Function (UPF) entity has the user data transport functions (performed by the S-GW and P-GW in 4G). The UPF anchors the UE IP addresses and enforces Quality of Service (QoS). In home routed roaming the visited UPF routes end-user data back to the home network UPF where the UE IP address is anchored. When roaming with local breakout, the end-user UE IP address is anchored in the visited UPF and end-user data is routed locally from the visited network.

In general, there is a lack of trusted solutions for managing and/or measuring the amount of data being used by mobile devices when roaming. The lack of trust is one of the hurdles restricting the spread and wide adoption of Local Breakout roaming. For example, remote network operators may be incentivized to slightly inflate measurements and charge the home network operator for higher amounts of data than the user has consumed. In addition, the user has no or very little control over how much data is being used when roaming.

It is therefore desirable to alleviate at least part of these problems and drawbacks and/or provide an improved solution for enabling efficient roaming.

SUMMARY

It is a general object to provide a more secure mechanism for enabling user equipment belonging to a home network to access data communication services in a visited network.

In particular it is desirable to enable successful application of local breakout in a visited network.

It is a specific object to provide a set of individual methods for enabling user equipment belonging to a home network to access data communication services in a visited network of a wireless communication system.

Another object is to provide user equipment configured for operation in a wireless communication system.

Yet another object is to provide a system for operation with a home network and configured to enable user equipment belonging to the home network to access data communication services in a visited network.

Still another object is to provide a system for operation with a visited network and configured to enable user equipment belonging to a home network to access data communication services in the visited network.

It is also an object to provide a network device comprising any one of such types of systems.

Another object is to provide one or more computer programs for enabling, when executed, user equipment belonging to a home network to access data communication services in a visited network Still another object is to provide a corresponding a computer-program product.

These and other objects are met by embodiments of the proposed technology.

According to a first aspect, there is provided a method for enabling user equipment belonging to a home network to access data communication services in a visited network of a wireless communication system. Basically, the method comprises:

obtaining at least one cryptographic token originating from a network node of the home network of the user equipment and cryptographically signed by a private key associated with the home network,
 wherein said at least one cryptographic token represents means for accessing data communication services via user data transport functions of the visited network;
 cryptographically signing the obtained and signed token by a private key associated with the user equipment to generate a double-signed token; and
 sending the double-signed token to a network node of the visited network for enabling the user equipment to access data communication services via the user data transport functions of the visited network.

By way of example, the method may be performed by the user equipment.

According to a second aspect, there is provided a method for enabling user equipment belonging to a home network to access data communication services in a visited network of a wireless communication system. Basically, the method comprises:

obtaining at least one cryptographic token from the user equipment that represents means for accessing data communication services via user data transport functions of the visited network,
 wherein said at least one cryptographic token is a double-signed token cryptographically signed by a private key associated with the home network and cryptographically signed by a private key associated with the user equipment; and
 validating the double-signed token for enabling the user equipment to access data communication services via the user data transport functions of the visited network.

For example, the method may be performed by at least one network node of the visited network.

According to a third aspect, there is provided a method for enabling user equipment belonging to a home network to access data communication services in a visited network of a wireless communication system. Basically, the method comprises:

issuing, to the user equipment, at least one cryptographic token representing means for accessing data communication services via user data transport functions of the visited network;
 cryptographically signing the cryptographic token by a private key associated with the home network; and
 sending the signed token to the user equipment and requesting the user equipment to cryptographically sign the signed token by a private key associated with the user equipment to generate a double-signed token for enabling the user equipment to access data communication services via the user data transport functions of the visited network when presenting the double-signed token to a network node of the visited network.

For example, the method may be performed by at least one network node of the home network.

According to a fourth aspect, there is provided user equipment configured for operation in a wireless communication system. The user equipment is configured to obtain at least one cryptographic token originating from a network node of a home network of the user equipment and cryptographically signed by a private key associated with the home network, the at least one cryptographic token representing means for accessing data communication services via user data transport functions of a visited network. The user equipment is configured to cryptographically sign the received and signed token by a private key associated with the user equipment to generate a double-signed token. The user equipment is also configured to send the double-signed token to a network node of the visited network for enabling the user equipment to access data communication services via the user data transport functions of the visited network.

According to a fifth aspect, there is provided a system for operation with a home network and configured to enable user equipment belonging to the home network to access data communication services in a visited network of a wireless communication system. The system is configured to issue, to the user equipment, at least one cryptographic token representing means for accessing data communication services via user data transport functions of the visited network. The system is configured to cryptographically sign the cryptographic token by a private key associated with the home network. The system is configured to send the signed token to the user equipment and request the user equipment to cryptographically sign the signed token by a private key associated with the user equipment to generate a double-signed token for enabling the user equipment to access data communication services via the user data transport functions of the visited network when presenting the double-signed token to a network node of the visited network.

According to a sixth aspect, there is provided a system for operation with a visited network and configured to enable user equipment belonging to a home network to access data communication services in the visited network of a wireless communication system. The system is configured to obtain at least one cryptographic token from the user equipment that represents means for accessing data communication services via user data transport functions of the visited network, the at least one cryptographic token being a double-signed token cryptographically signed by a private key associated with the home network and cryptographically signed by a private key associated with the user equipment. The system is also configured to validate the double-signed token for enabling the user equipment to access data communication services via the user data transport functions of the visited network.

According to a seventh aspect, there is provided a network device comprising a system according to the fifth or sixth aspect of the invention.

By way of example, the network device may be a network node or a cloud-based network device.

According to an eight aspect, there is provided a computer program for enabling, when executed, user equipment belonging to a home network to access data communication services in a visited network of a wireless communication system. The computer program comprises instructions, which when executed by at least one processor, cause the at least one processor to:

obtain at least one cryptographic token originating from a network node of the home network of the user equipment and cryptographically signed by a private key associated with the home network, wherein said at least one cryptographic token represents means for accessing data communication services via user data transport functions of the visited network;

cryptographically sign the received and signed token by a private key associated with the user equipment to generate a double-signed token; and prepare a message including the double-signed token for sending to a network node of the visited network for enabling the user equipment to access data communication services via the user data transport functions of the visited network.

According to a ninth aspect, there is provided a computer program for enabling, when executed, user equipment belonging to a home network to access data communication services in a visited network of a wireless communication system. The computer program comprises instructions, which when executed by at least one processor, cause the at least one processor to:

obtain at least one cryptographic token from the user equipment that represents means for accessing data communication services via user data transport functions of the visited network, said at least one cryptographic token being a double-signed token cryptographically signed by a private key associated with the home network and cryptographically signed by a private key associated with the user equipment; and validate the double-signed token for enabling the user equipment to access data communication services via the user data transport functions of the visited network.

According to a tenth aspect, there is provided a computer program for enabling, when executed, user equipment belonging to a home network to access data communication services in a visited network of a wireless communication system. The computer program comprises instructions, which when executed by at least one processor, cause the at least one processor to:

issue, to the user equipment, at least one cryptographic token representing means for accessing data communication services via user data transport functions of the visited network;

cryptographically sign the cryptographic token by a private key associated with the home network; and prepare a message including the signed token for sending to the user equipment and requesting the user equipment to cryptographically sign the signed token by a private key associated with the user equipment to generate a double-signed token for enabling the user equipment to access data communication services via the user data transport functions of the visited network when presenting the double-signed token to a network node of the visited network.

According to an eleventh aspect, there is provided a computer-program product comprising a non-transitory computer-readable medium having stored thereon a computer program according to any of the eighth, ninth or tenth aspect.

In this way, it is possible to provide a more secure mechanism for enabling user equipment belonging to a home network to access data communication services in a visited network.

By way of example, the home network operator acts as a "central bank" by issuing and cryptographically signing cryptographic token(s). The thus signed token(s) are also signed by a user to provide double-signed token(s), which can then be presented to a visited network operator as a means for accessing data communication services in the visited network.

The visited network operator may validate the double-signed token(s) to provide access to the services, and may then send consumed token(s) to the home network operator for redemption. The active signature of the token(s) by the user equipment shows to the home network operator that the user has actually chosen to use the issued token(s) in exchange for data communication services in the visited network.

This mechanism sustains healthy trust relations, e.g. for successful application of local breakout in the visited network. In a sense, the proposed technology can be regarded as a token-based clearing system for roaming or at least a support mechanism for such a clearing system.

It is not feasible for the visited network operator to falsify tokens and expect to be successfully redeemed for such fake tokens, since the tokens must have been signed by both the home network and the considered user of the data communication services in order to be valid.

Optionally, the proposed technology may also enable efficient prevention of double-spending of tokens by letting the visited network operator explicitly request the home network operator to validate and finally authorize the use of the double-signed token(s).

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Figure 1A:
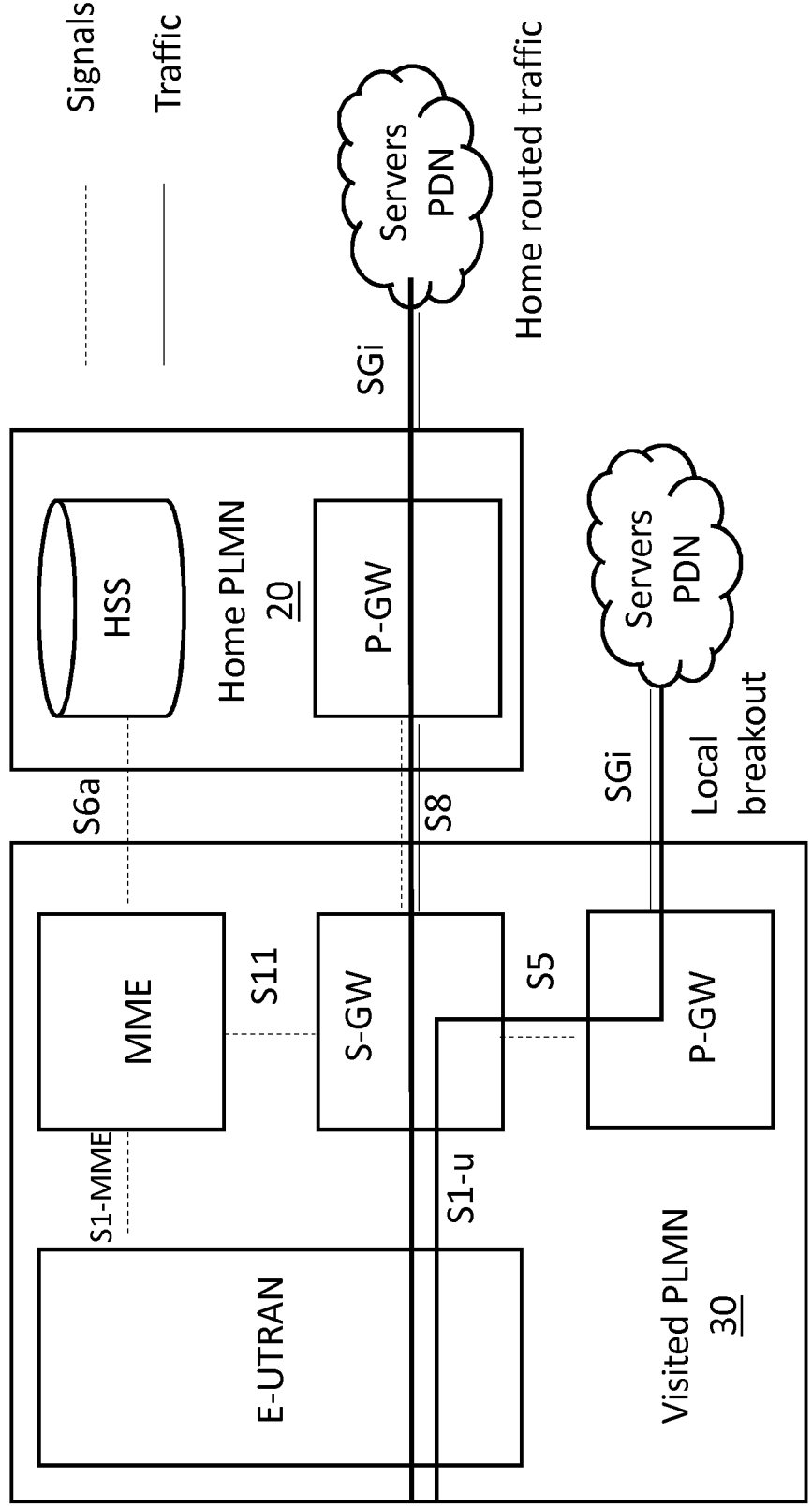
FIG. 1A is a schematic diagram illustrating an example of an overall wireless communication environment providing a context for roaming between different wireless networks.
Figure 1B:
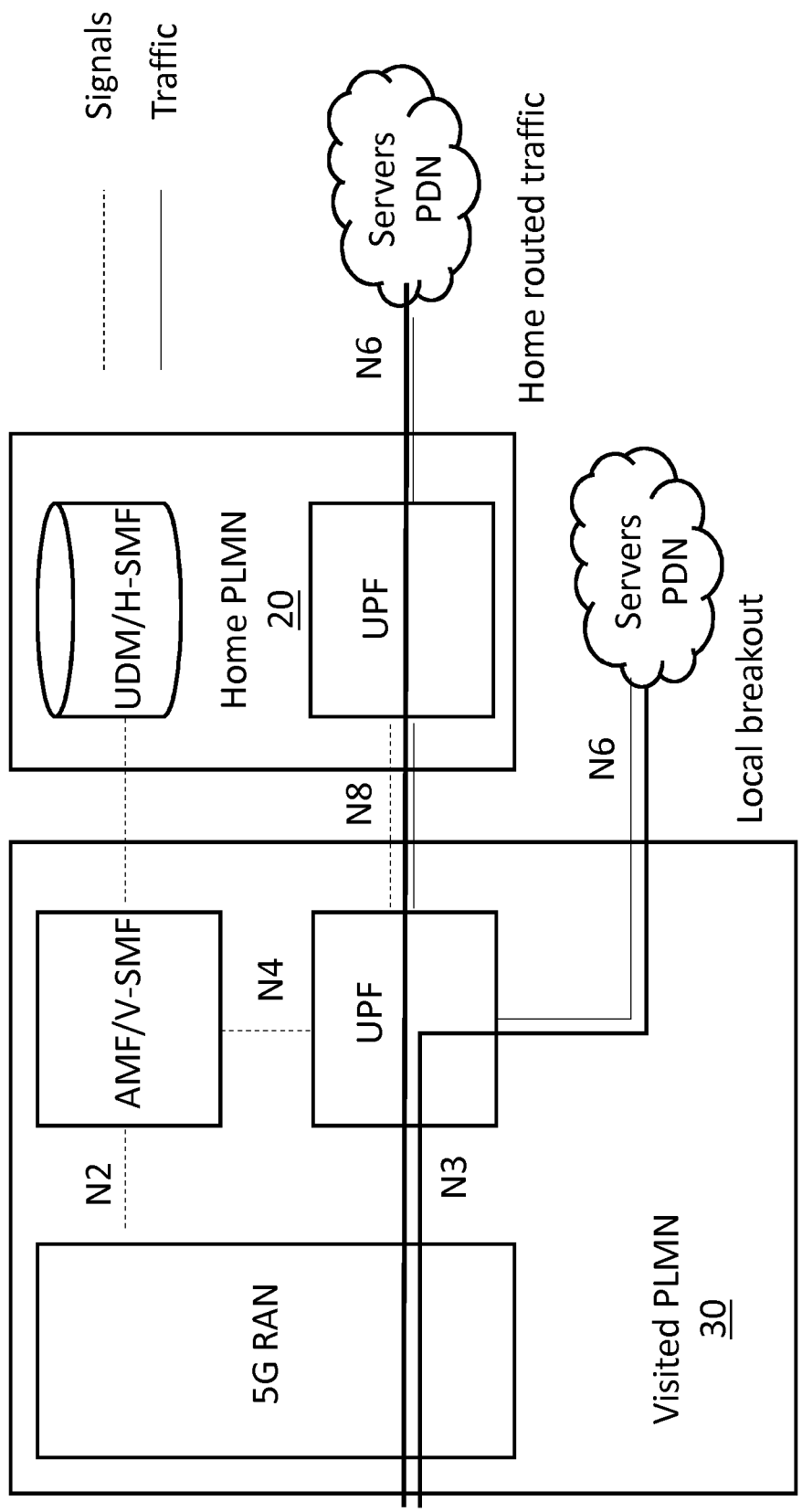
FIG. 1B is a schematic diagram illustrating another example of an overall wireless communication environment providing a context for roaming between different wireless networks.

Throughout the drawings, the same reference designations are used for similar or corresponding elements.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the non-limiting term "network node" may refer to base stations, access points, packet gateways, and network control nodes such as network controllers in the access network and/or core network and/or management infrastructure, including also Evolved Packet Core (EPC) and/or IP Multimedia Subsystem (IMS) nodes.

In particular, the term "base station" may encompass different types of radio base stations including standardized base station functions such as Node Bs, or evolved Node Bs (eNBs), gNBs and/or ng-eNBs, and also macro/micro/pico radio base stations, home base stations, also known as femto base stations, relay nodes, repeaters, radio access points, Base Transceiver Stations (BTSs), and even radio control nodes controlling one or more Remote Radio Units (RRUs), or the like.

A "network operator" may be any entity, or collection of operative components and/or network nodes, that operates, deploys, and/or maintains network infrastructure for providing communication services, and may encompass any telecommunication operator owning and/or leasing a network infrastructure such as base stations, routers, switches, transport nodes and/or a service delivery infrastructure including equipment such as servers, data centers and so forth.

In other words, a network operator may be a communications service provider that provides wireless and/or wired voice and/or data communication for users. Network operators may create a network of high-end telecommunication devices, specialized software and end subscriber identity modules to provide end-to-end communication between wired and wireless telecom end-user devices.

As used herein, the term "network device" may refer to any device located in connection with a communication network, including but not limited to devices in access networks, core networks and similar network structures. The term network device may also encompass cloud-based network devices.

As used herein, the non-limiting terms "wireless communication device", "station", "User Equipment (UE)", and "terminal" may refer to a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a device to device UE, a machine type UE or UE capable of machine to machine communication, Customer Premises Equipment (CPE), Laptop Embedded Equipment (LEE), Laptop Mounted Equipment (LME), USB dongle, a portable electronic radio communication device, a sensor device equipped with radio communication capabilities or the like. In particular, the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 2:
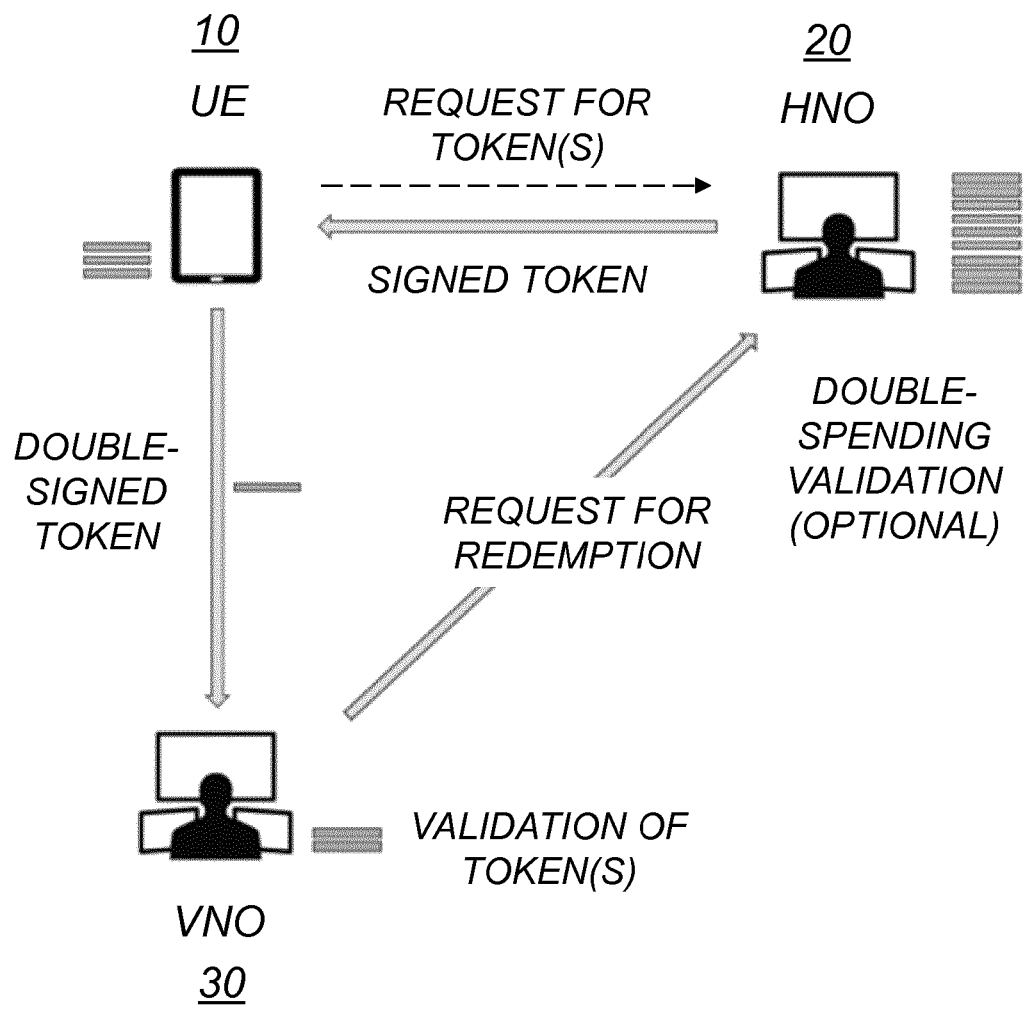
FIG. 2 is a schematic diagram illustrating an example overview of signaling and/or actions involved in the novel mechanism of the proposed technology.

FIG. 2 is a schematic diagram illustrating an example overview of signaling and/or actions involved in the novel mechanism of the proposed technology. The overall mechanism involves a UE 10, a home network operator, HNO 20 and a visited network operator, VNO 30. The proposed technology basically concerns a token-based clearing system for roaming or at least a support mechanism for such a clearing system. The tokens represent means for accessing data communication services via user data transport functions such as a packet gateway (P-GW) or a UPF entity of the visited network 30, which is commonly referred to as Local Breakout roaming.

It should be understood that the proposed technology is generally applicable to Local Breakout roaming, especially 4G/LTE Local Breakout or 5G Local Breakout, but not limited thereto.

As schematically illustrated in FIG. 2, the token(s) originates from the HNO 20, which issues and cryptographically signs the token(s), optionally in response to a request for tokens from the UE 10. The HNO 20 sends the signed token(s) to the UE 10 and requests the user equipment to cryptographically sign the signed token by a private key associated with the user equipment to generate a double-signed token for enabling Local Breakout roaming in the visited network. When the UE 10 needs access to data communication services in the visited network, the UE 10 signs one or more of the issued tokens and sends the thereby double-signed tokens to the VNO 30, which may validate the received token(s) and provide the requested data communication services in return for the token(s). By way of example, each token may represent a predetermined or maximum data consumption limit and/or price range limitation. When performing clearing between the VNO 30 and the HNO 20, the consumed token(s) are passed from the VNO 30 to the HNO 20, in a request for redemption of provided data services, to validate and/or verify the amount of tokens spent and thereby a corresponding amount of data consumed by the UE 10 in the visited network.

In a sense, the home network operator acts as a "central bank" by issuing and cryptographically signing cryptographic token(s). The thus signed token(s) are then also signed by the user to provide double-signed token(s), which can be presented to a visited network operator as a means for accessing data communication services in the visited network.

The visited network operator may validate the double-signed token(s) to provide access to the services, and may then send consumed token(s) to the home network operator for redemption. The active signature of the token(s) by the user equipment shows to the home network operator that the user has actually chosen to use the issued token(s) in exchange for data communication services in the visited network.

This mechanism sustains healthy trust relations, e.g. for successful application of local breakout in the visited network. It is not feasible for the visited network operator to falsify tokens and expect to be successfully redeemed for such fake tokens, since the tokens must have been signed by both the home network and the considered user of the data communication services in order to be valid.

Optionally, the proposed technology may also enable efficient prevention of double-5 spending of tokens by letting the visited network operator explicitly request the home network operator to validate and finally authorize the use of the double-signed token(s).

In the following, schematic examples of the procedures and/or actions performed by each of the individual parties such as the user equipment, the home network operator and the visited network operator will now be described.

Figure 3:
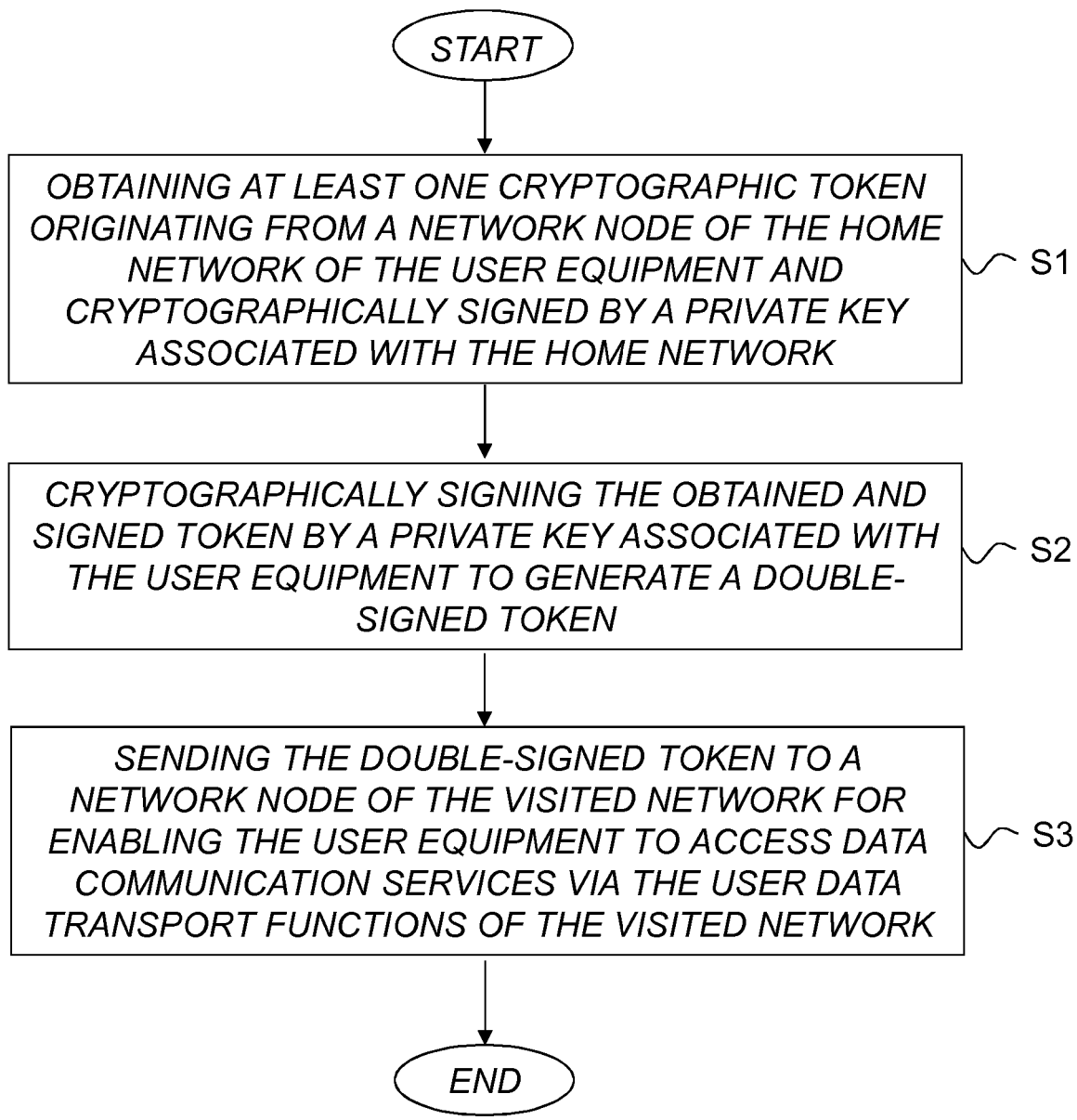
FIG. 3 is a schematic flow diagram illustrating an example of a method for enabling user equipment belonging to a home network to access data communication services in a visited network according to an embodiment.

FIG. 3 is a schematic flow diagram illustrating an example of a method for enabling user equipment belonging to a home network to access data communication services in a visited network according to an embodiment.

Basically, the method comprises:

S1: obtaining at least one cryptographic token originating from a network node of the home network of the user equipment and cryptographically signed by a private key associated with the home network,
   wherein the at least one cryptographic token represents means for accessing data communication services via user data transport functions of the visited network;

S2: cryptographically signing the obtained and signed token by a private key associated with the user equipment to generate a double-signed token; and S3: sending the double-signed token to a network node of the visited network for enabling the user equipment to access data communication services via the user data transport functions of the visited network.

By way of example, the user data transport functions may be provided by a Packet Data Network, PDN, Gateway, also referred to as a P-GW, in the visited network, and the method may be applied for Local Breakout to enable data communication services for the user equipment via the P-GW in the visited network.

Alternatively, the user data transport functions may be provided by a User Plane Function, UPF, entity in the visited network, and the method may be applied for Local Breakout to enable data communication services for the user equipment via the UPF entity in the visited network.

For example, an identifier of the visited network may be included in or associated to the token before the user equipment cryptographically signs the token.

As mentioned, each token may for example represent a predetermined or maximum data consumption limit and/or price range limitation.

Preferably, the method may be performed by the user equipment.

Figure 4:
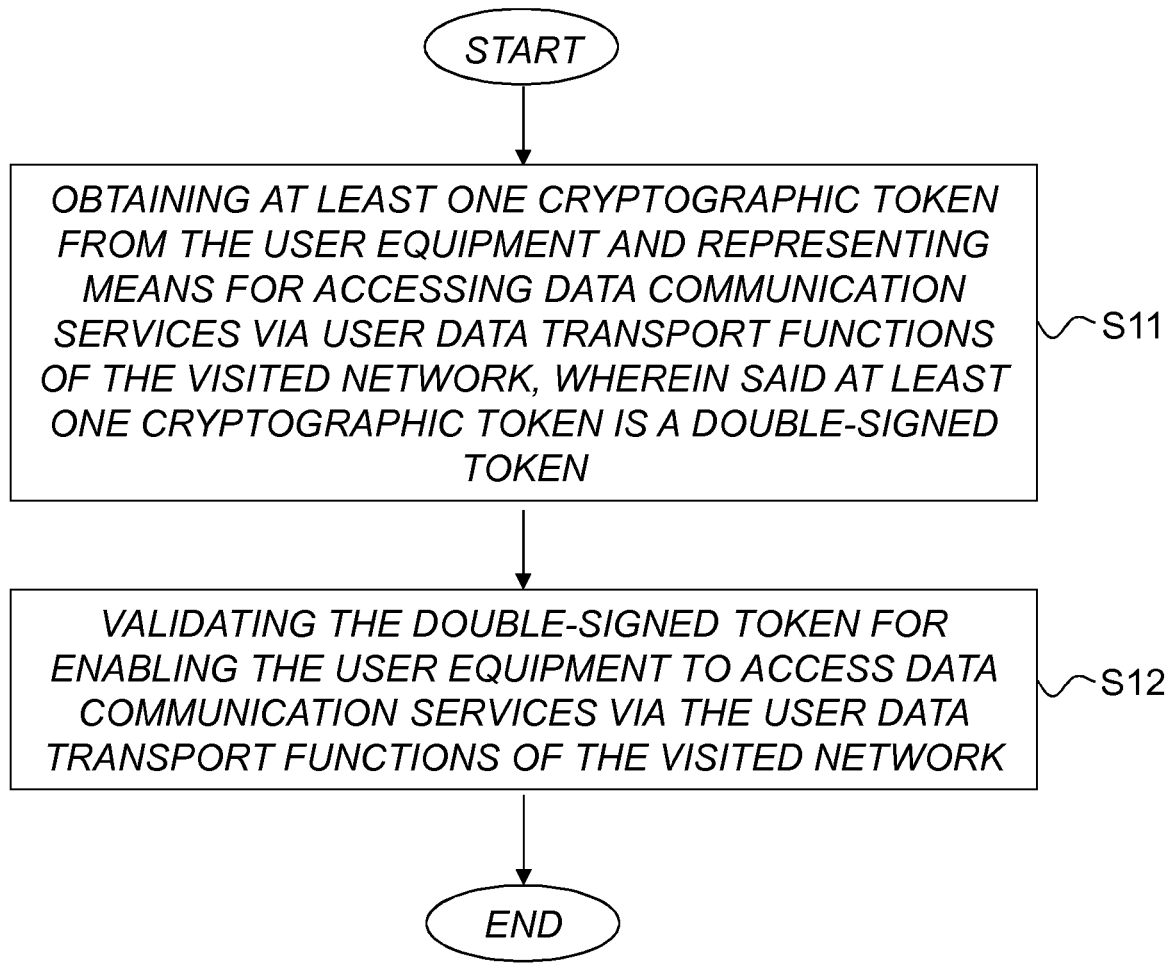
FIG. 4 is a schematic flow diagram illustrating an example of a method for enabling user equipment belonging to a home network to access data communication services in a visited network according to another embodiment.

FIG. 4 is a schematic flow diagram illustrating an example of a method for enabling user equipment belonging to a home network to access data communication services in a visited network according to another embodiment.

Basically, the method comprises:

S11: obtaining at least one cryptographic token from the user equipment that represents means for accessing data communication services via user data transport functions of the visited network, wherein the at least one cryptographic token is a double-signed token cryptographically signed by a private key associated with the home network and cryptographically signed by a private key associated with the user equipment; and S12: validating the double-signed token for enabling the user equipment to access data communication services via the user data transport functions of the visited network.

Similarly to what has been described above, the user data transport functions may be provided by a Packet Data Network, PDN, Gateway, also referred to as a P-GW, in the visited network, and the method may be applied for Local Breakout to enable data communication services for the user equipment via the P-GW in the visited network.

Alternatively, the user data transport functions may be provided by a User Plane Function, UPF, entity in the visited network, and the method may be applied for Local Breakout to enable data communication services for the user equipment via the UPF entity in the visited network.

By way of example, the double-signed token may have cryptographic signatures generated by the private key associated with the home network and the private key associated with the user equipment, and the double-signed token may thus be validated by verifying the cryptographic signatures based on a corresponding public key associated with the home network and a corresponding public key of the user equipment.

Figure 5:
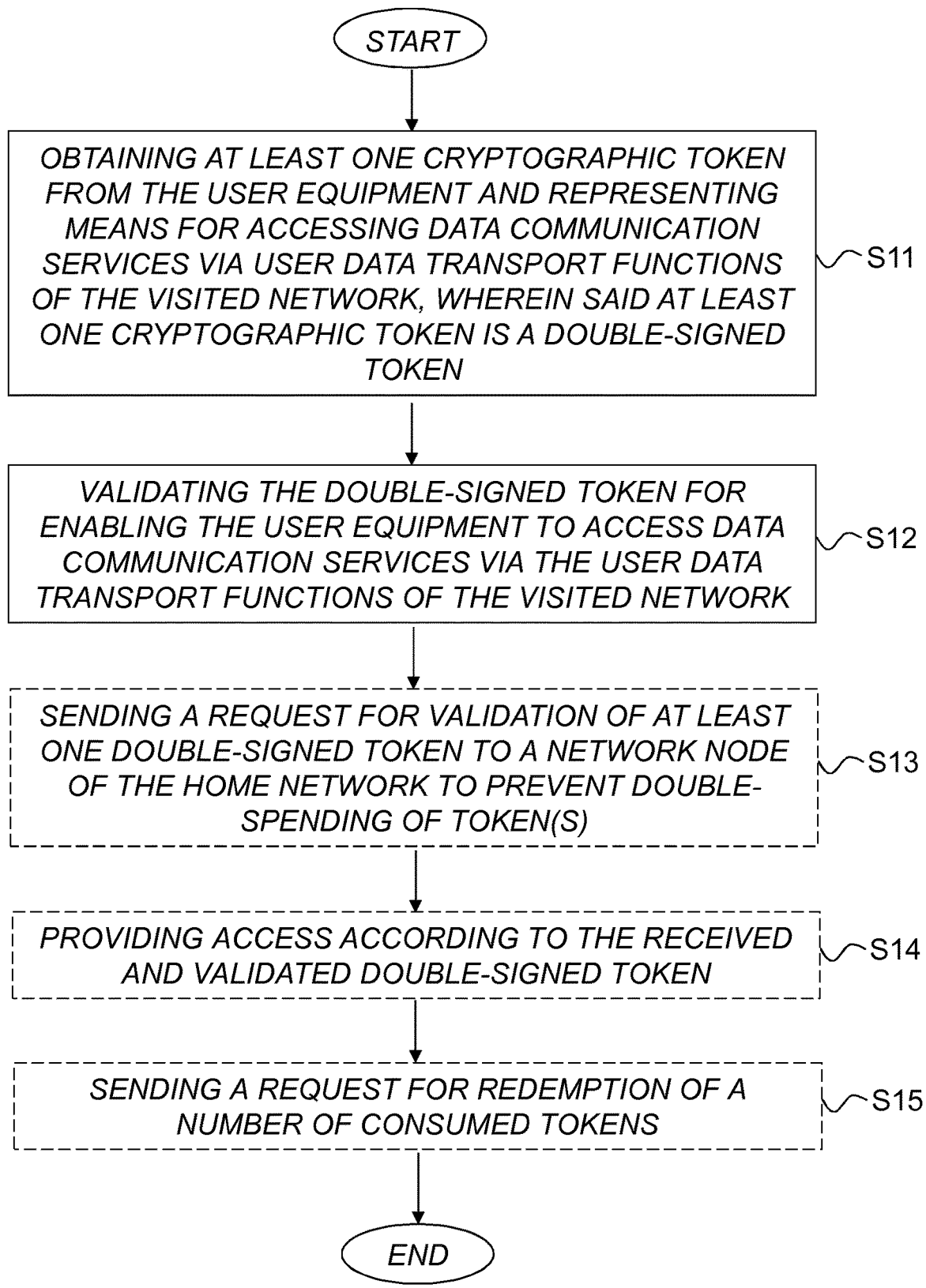
FIG. 5 is a schematic flow diagram illustrating another example of a method for enabling user equipment belonging to a home network to access data communication services in a visited network according to an embodiment.

FIG. 5 is a schematic flow diagram illustrating another example of a method for enabling user equipment belonging to a home network to access data communication services in a visited network according to an embodiment.

Optionally, the method may further comprise sending S13 a request for validation of at least one double-signed token to a network node of the home network to prevent double-spending of token(s).

In a particular example, the method further comprises providing S14 access for the user equipment to data communication services in the visited network according to the received and validated double-signed token, whereby the token is considered to be consumed.

For example, the method may further comprise sending S15 a request for redemption of a number of consumed tokens to a network node of the home network.

By way of example, each token represents a predetermined or maximum data consumption limit and/or price range limitation.

Preferably, the method may be performed by at least one network node of the visited network.

Figure 6:
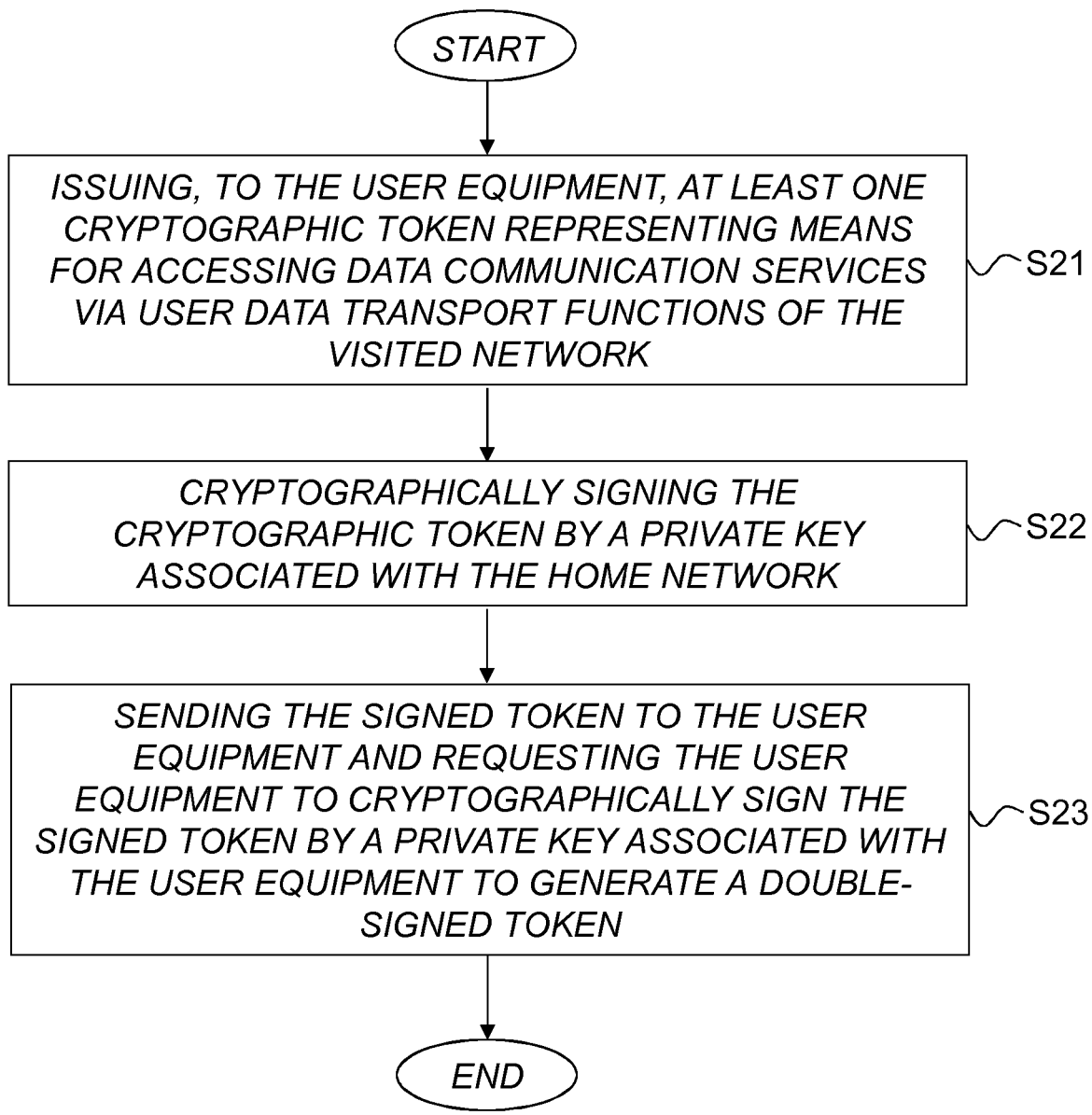
FIG. 6 is a schematic flow diagram illustrating an example of a method for enabling user equipment belonging to a home network to access data communication services in a visited network according to yet another embodiment.

FIG. 6 is a schematic flow diagram illustrating an example of a method for enabling user equipment belonging to a home network to access data communication services in a visited network according to yet another embodiment.

Basically, the method comprises:

S21: issuing, to the user equipment, at least one cryptographic token representing means for accessing data communication services via user data transport functions of the visited network;

S22: cryptographically signing the cryptographic token by a private key associated with the home network; and S23: sending the signed token to the user equipment and requesting the user equipment to cryptographically sign the signed token by a private key associated with the user equipment to generate a double-signed token for enabling the user equipment to access data communication services via the user data transport functions of the visited network when presenting the double-signed token to a network node of the visited network.

Similarly to what has been described above, the user data transport functions may be provided by a Packet Data Network, PDN, Gateway, also referred to as a P-GW, in the visited network, and the method may be applied for Local Breakout to enable data communication services for the user equipment via the P-GW in the visited network.

Alternatively, the user data transport functions may be provided by a User Plane Function, UPF, entity in the visited network, and the method may be applied for Local Breakout to enable data communication services for the user equipment via the UPF entity in the visited network.

Figure 7:
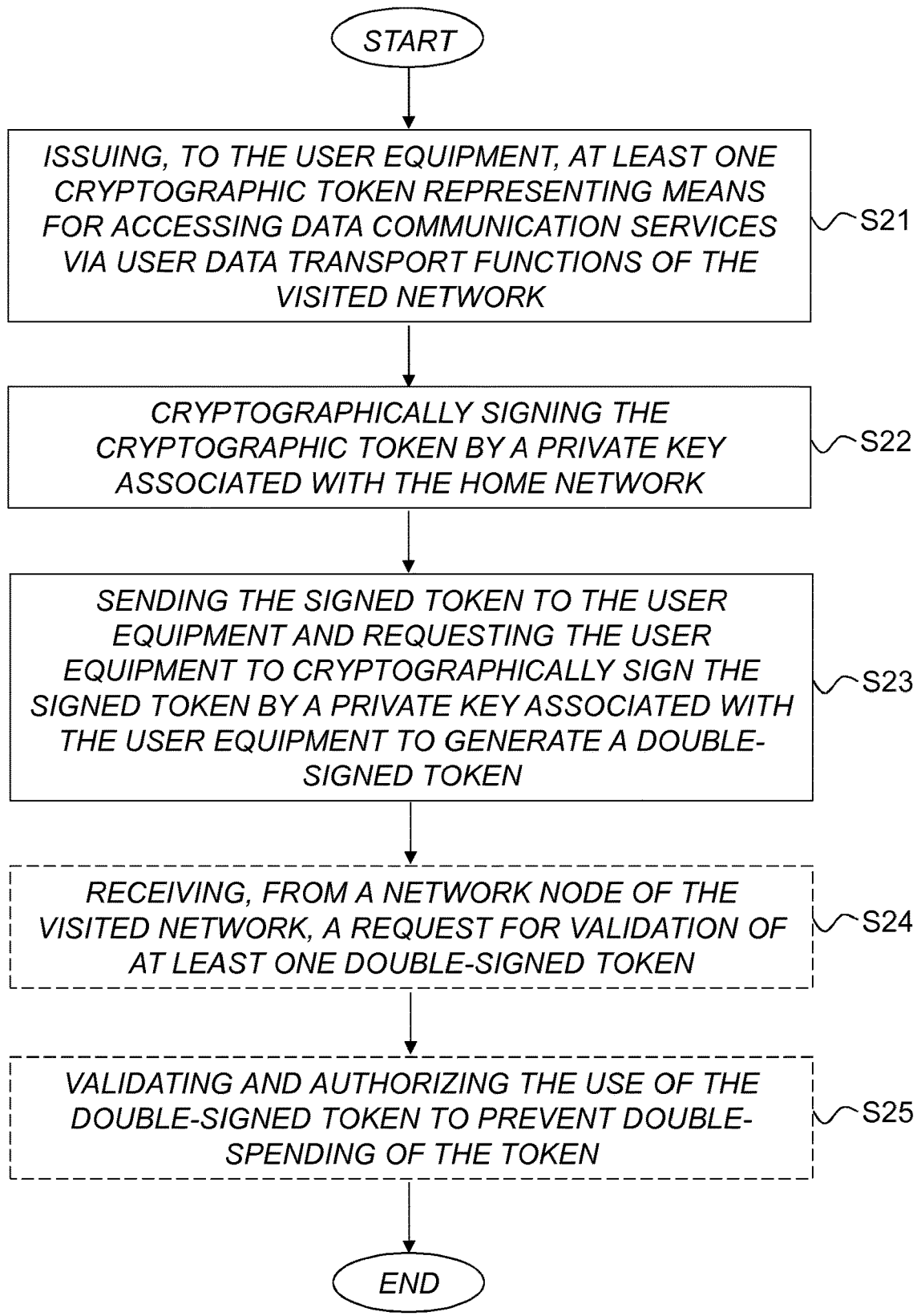
FIG. 7 is a schematic flow diagram illustrating another example of a method for enabling user equipment belonging to a home network to access data communication services in a visited network according to an embodiment.

FIG. 7 is a schematic flow diagram illustrating another example of a method for enabling user equipment belonging to a home network to access data communication services in a visited network according to an embodiment.

Optionally, the method further comprises:

S24: receiving, from a network node of the visited network, a request for validation of at least one double-signed token; and S25: validating and authorizing the use of the double-signed token to prevent double-spending of the token.

Figure 8:
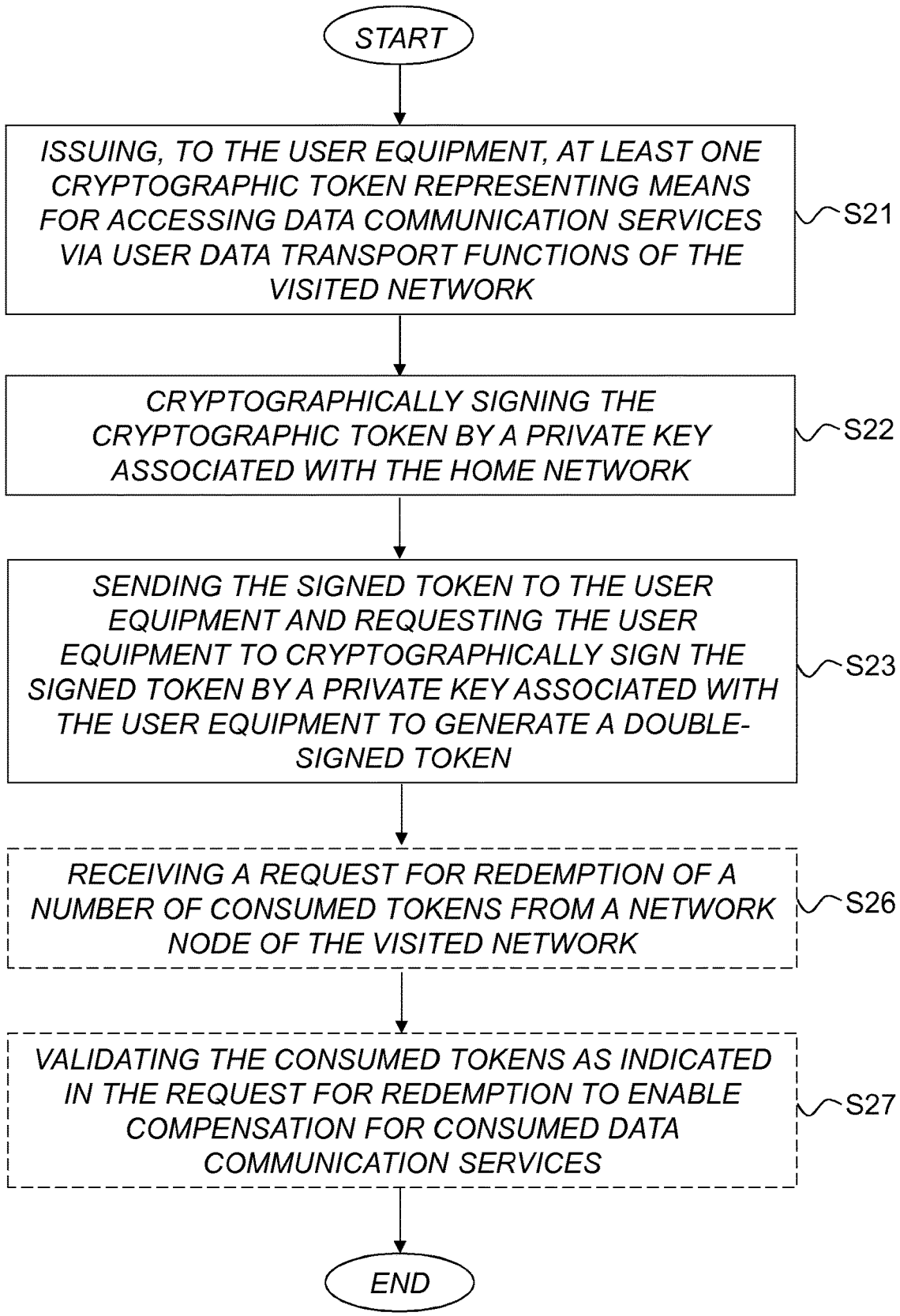
FIG. 8 is a schematic flow diagram illustrating yet another example of a method for enabling user equipment belonging to a home network to access data communication services in a visited network according to an embodiment.

FIG. 8 is a schematic flow diagram illustrating yet another example of a method for enabling user equipment belonging to a home network to access data communication services in a visited network according to an embodiment.

In this particular example, the method further comprises:

S26: receiving a request for redemption of a number of consumed tokens from a network node of the visited network; and S27: validating the consumed tokens as indicated in the request for redemption to enable compensation to be made to the visited network for consumed data communication services.

By way of example, the step S27 of validating the consumed tokens may be performed also based on user measurements of the corresponding data communication services. In this way, the user can retain full control over the cost of data and the amount of data actually being billed.

Preferably, the method may be performed by at least one network node of the home network.

The proposed technology is generally applicable for roaming, and especially, but not limited for enabling user equipment to access data communication services via user data transport functions of the visited network through Local Breakout.

Figure 9:
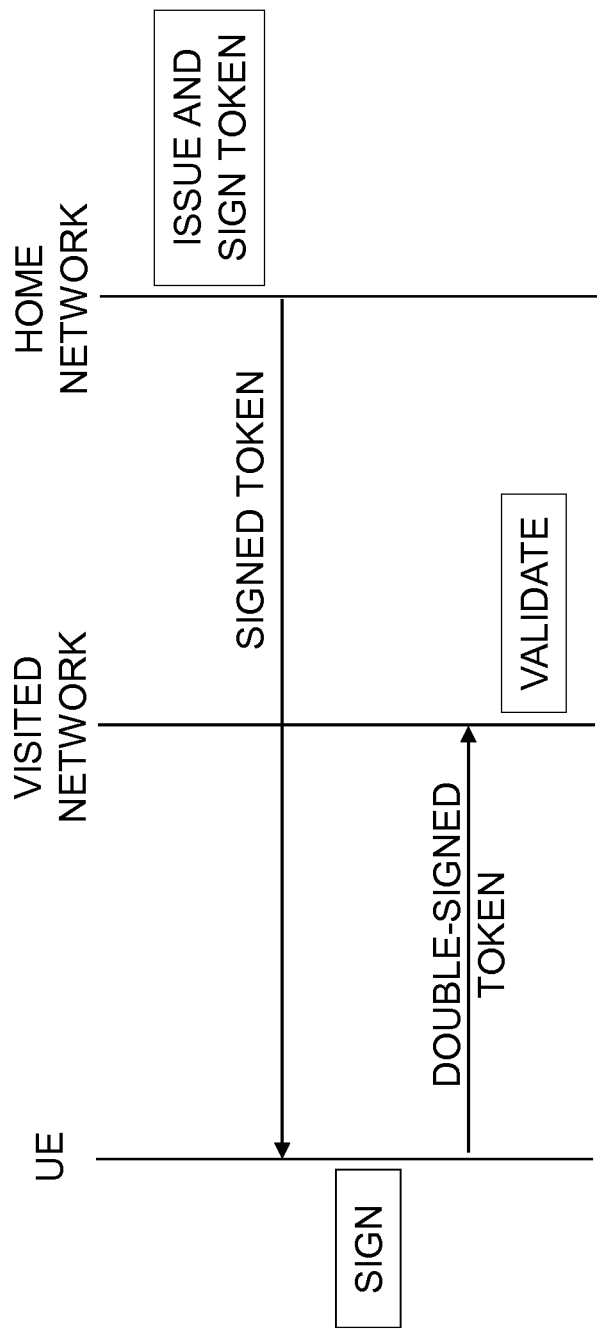
FIG. 9 is a schematic diagram illustrating an example of signaling and/or actions performed by the involved parties according to an embodiment.

FIG. 9 is a schematic diagram illustrating an example of signaling and/or actions performed by the involved parties according to an embodiment. Basically, the home network issues and signs at least one token, and sends the token to the UE. The UE in turn signs the received token to generate a double-signed token and sends the double-signed token to the visited network. The visited network validates the received token for enabling access to data communication services for the UE in the visited network.

Figure 10:
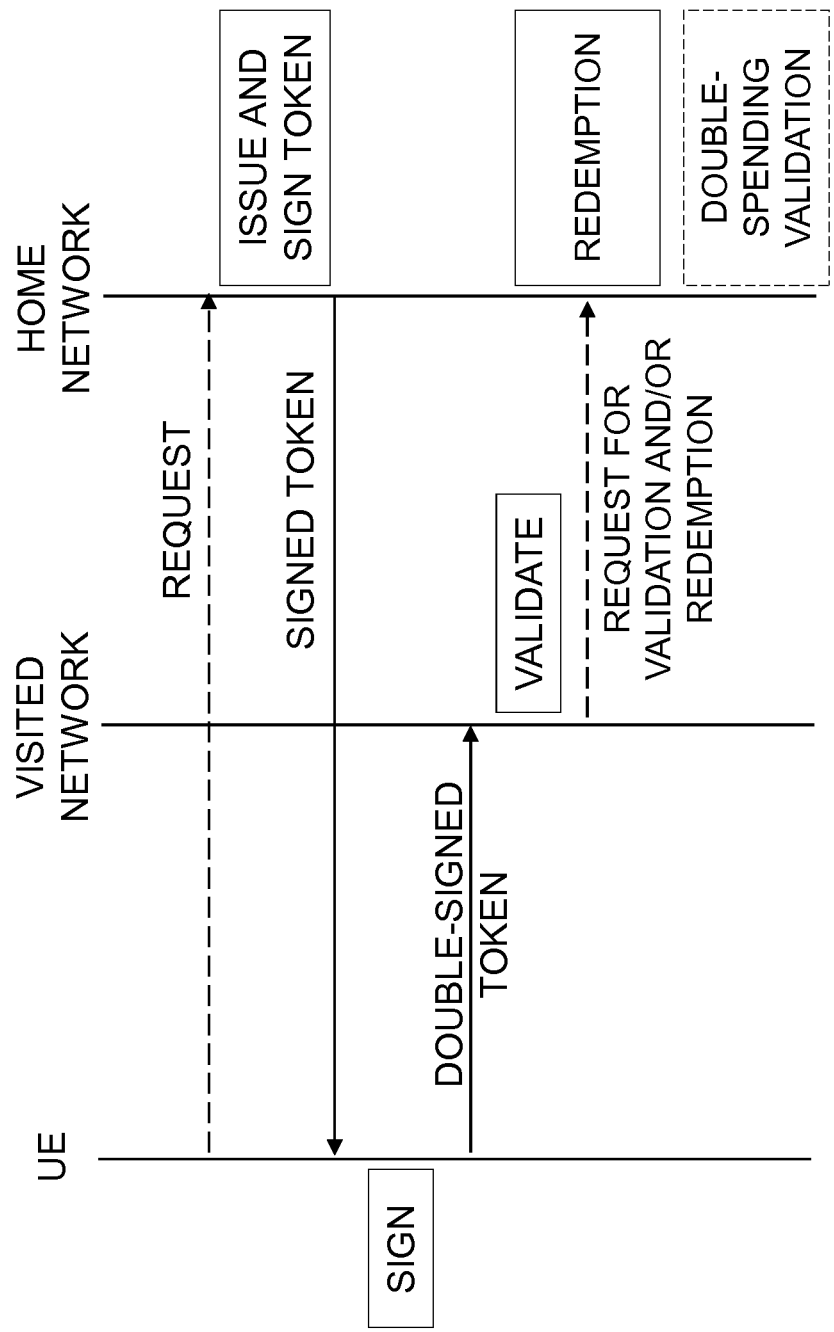
FIG. 10 is a schematic diagram illustrating another example of signaling and/or actions performed by the involved parties according to an embodiment.

FIG. 10 is a schematic diagram illustrating another example of signaling and/or actions performed by the involved parties according to an embodiment. In this particular example, the UE sends an optional request for one or more tokens to the home network, which in turn issues and signs the token(s). For example, the request for token(s) by the UE may be sent in response to an offer for roaming services by the home network operator. Alternatively, the tokens may be issued in advance, e.g. as part of a subscription, or by default when the UE enters into the visited network. In any case, the token(s) is/are to be "activated" by the user signing the issued token(s) and sending the thereby double-signed token(s) to the visited network operator. The visited network validates the received token for enabling access to data communication services for the UE in the visited network. The visited network may then send consumed token(s) to the home network operator for redemption. The active signature of the token(s) by the user equipment shows to the home network operator that the user has actually chosen to use the issued token(s) in exchange for data communication services in the visited network.

Optionally, the proposed technology may also enable efficient prevention of double-spending of tokens by letting the visited network operator explicitly request the home network operator to validate and finally authorize the use of the double-signed token(s).

For a better understanding, the proposed technology will now be described with reference to one or more non-limiting examples.

The proposed technology provides a general framework for an improved clearing system for roaming, and enables considerable improvements to be achieved with respect to trust issues surrounding roaming. In particular, the novel use of cryptographic tokens as presented herein may remove trust issues surrounding roaming in general, and Local Breakout in particular. Signing the tokens twice, both at the HNO to verify the origin and in the UE to verify the assignment to the VNO, allows a more secure mechanism for enabling user equipment belonging to the HNO to access data communication services offered by the VNO. By way of example, when doing settlement/charging between operators, the tokens can be used to solve and/or avoid disputes around the amount of data consumed. As a consequence, existing technologies like 4G/LTE or 5G Local Breakout can be enhanced in terms of trust.

For example, embodiments of the proposed technology may offer control over the consumption of tokens to the user, including the ability to restrict the maximum price per data unit.

When doing clearing between the VNO and the HNO, tokens may be passed by the VNO to the HNO for verification of the amount of data consumed by the UE. When combined with user measurements, or user-based indication of user satisfaction or user experience of the data services, this may mitigate the problem of one-sided measuring of data consumption when using Local Breakout for data access. For example, the HNO and UE may not have to be dependent on the consumption measurements made by the VNO, as the measurements are "safeguarded" by the token system. The UE can retain better control over the cost of data and the amount of data being used by monitoring the token consumption and the cost associated with spending tokens when visiting a network. In addition, discrepancies in charging and billing between the HNO and the VNO may optionally be detected and remedied.

Before the mid-1970s, all cipher systems were using symmetric key algorithms, in which the same cryptographic key is used with the underlying algorithm by both the sender and the recipient, who must both keep it secret. Of necessity, the key in every such system had to be exchanged between the communicating parties in some secure way prior to any use of the system—a secure channel.

By contrast, in a so-called public key system, the public keys can be disseminated widely and openly—and only the private key needs to be kept secure by its owner. Public key cryptography may be used for public key encryption, in which a message is encrypted with a recipient's public key. The message cannot be decrypted by anyone who does not possess the matching private key, who is thus presumed to be the owner of that key and the person associated with the public key. This is used in an attempt to ensure confidentiality. Public key cryptography may also be used for digital signatures, in which a message is signed with the sender's private key and can be verified by anyone who has access to the sender's public key. This verification proves that the sender had access to the private key, and therefore is likely to be the entity associated with the public key. This also ensures that the message has not been tampered with, as a signature is mathematically bound to the message it originally was made with, and verification will fail for practically any other message, no matter how similar to the original message.

An important issue is confidence/proof that a particular public key is authentic, i.e. that it is correct and belongs to the person or entity claimed, and has not been tampered with or replaced by a malicious third party. One possible approach for this is by means of a Public Key Infrastructure (PKI), in which one or more certificate authorities certify ownership of key pairs.

The Policy and Charging Rules Function, PCRF, may be considered as a part of the network architecture that aggregates information to and from the network, operational support systems and/or subscriber databases, supporting the creation of rules and allowing and policy decisions and/or rule enforcement as well as charging for each user or subscriber belonging to the considered network operator. The policy function generally coordinates the various network resources to provide requested services to authorized subscribers at the appropriate Quality of Service, QoS, levels. For example, a set of policy rules can be activated to verify access permission, manage QoS and so forth, in real-time. The PCRF may enforce these policy rules through its interaction with a corresponding enforcement function, e.g. implemented at the access gateway node, P-GW.

Example of Use Case—International Roaming

International mobile roaming is a service that allows mobile users to continue to use their mobile phone or other mobile device to make and receive voice calls, send text messages, browse the internet, and send and receive emails, while visiting another country.

Figures 1, 11:
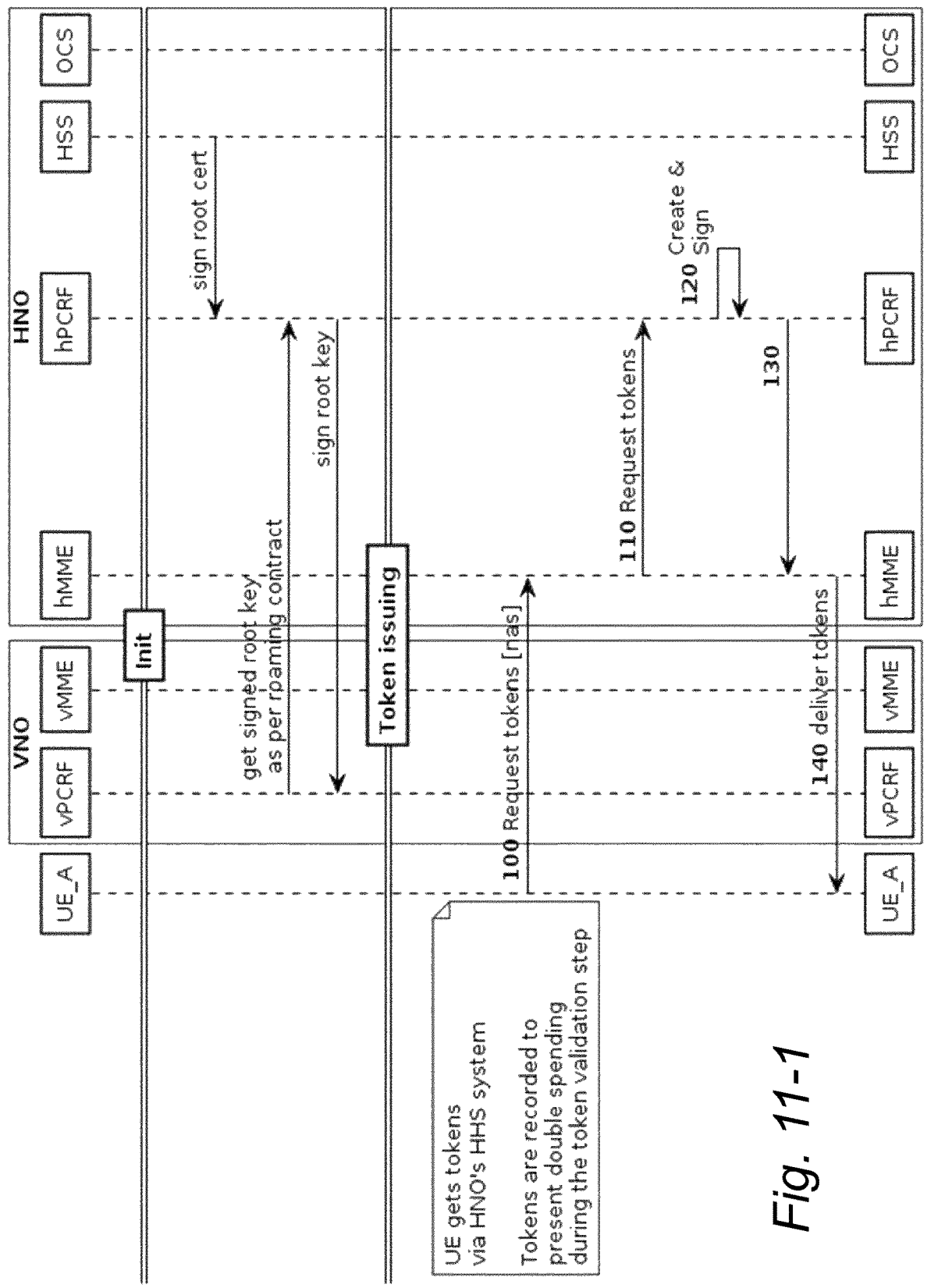
FIG. 11 is a schematic diagram illustrating yet another example of signaling and/or actions performed by the involved parties according to an embodiment.
Figures 2, 11:
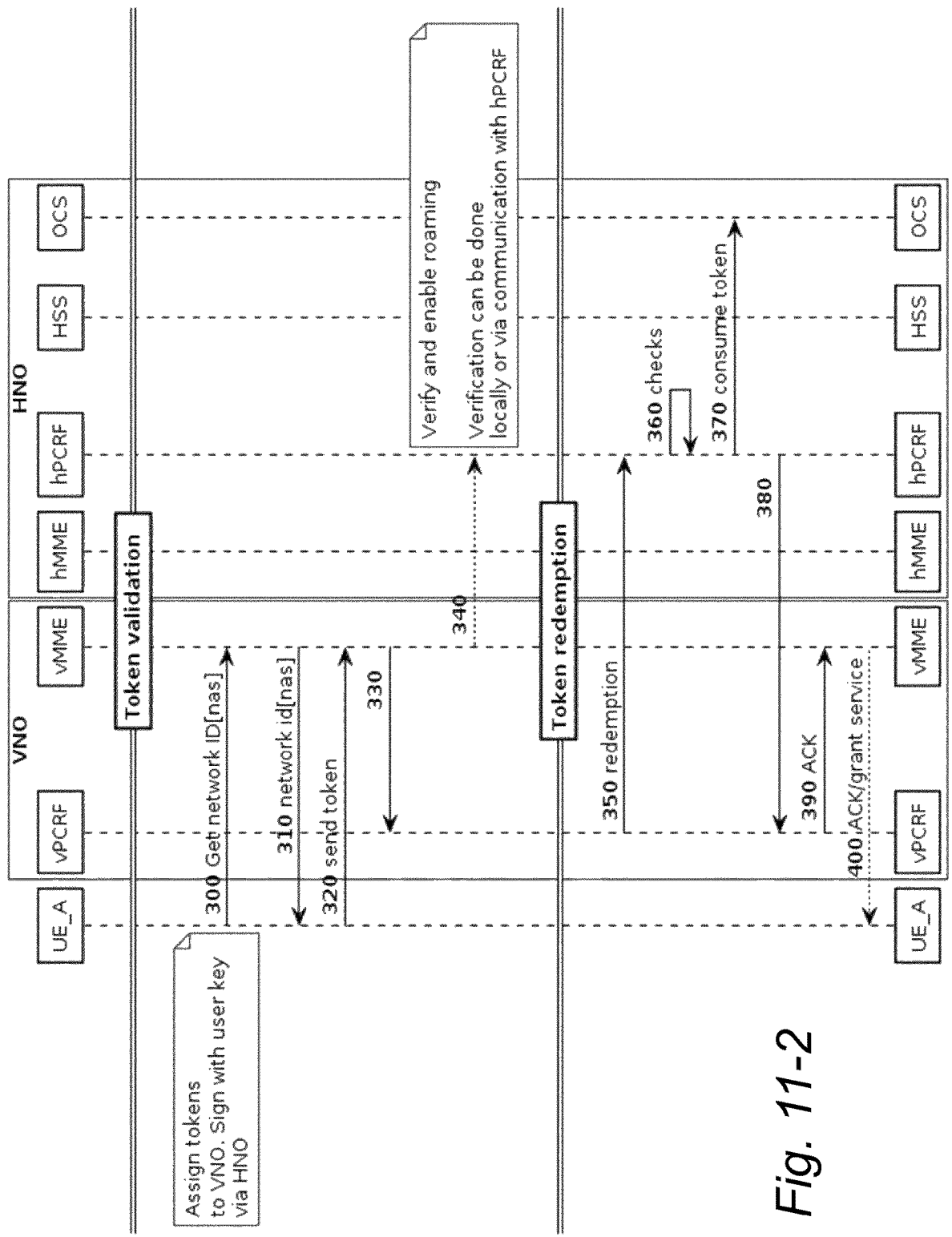

In this use case a user is visiting another country and the visited network (VNO) has a roaming agreement with home network (HNO), see FIG. 11.

It can be noted that the traffic between the UE and the HNO may have to be tunneled back to the HNO via the VNO. However, the schematic diagram of FIG. 11 is simplified to omit the tunneling procedure.

1. The HNO and VNO need to have a mutual verification procedure in place, prior to the token exchange. This is done in the Init-step of the diagram, e.g. using PKI technology. For example, the HSS may sign a root certificate for the hPCRF, which may then send a signed root key to the vPCRF as per the roaming contract between HNO and VNO.
2. A user may request a certain number of tokens from HNO, and the HNO issues (creates and signs) and registers requested tokens to the user's subscription. By way of example, the issuing of tokens may be done by the hPCRF. For example, the hMME then sets the issued tokens for delivery to the requesting user.
3. As part of the roaming negotiation with the VNO, the UE may assign tokens to the VNO through signing and provide the assigned tokens to the VNO. The VNO can locally verify the signatures of the HNO and the user, and optionally also verify the token ID with the hPCRF to protect against double spending.

The user may continuously provide tokens to the VNO to compensate for use of services such as voice, text, browsing and so forth. For example:
i. The user may provide consumed tokens in advance related to a certain number of text messages, voice calls or amount of data, and/or
ii. The user may provide consumed tokens afterwards based on certain number of text messages, voice calls or amount of data.

4. The VNO may initiate exchange of consumed tokens with HNO for redemption. For example, the HNO may validate and authorize the amount of tokens associated with a certain subscriber, compensate the VNO, and bill the user for the consumed services. For example, consumed tokens may be transferred to the Online Charging System (OCS) for charging purposes.

Optionally, the user may provide a device-generated token report to the HNO. For example, such a report may be sent on a regular basis like once a day, week or similar periodicity and may include details about used services and consumed tokens. The HNO may then use the report to ensure that consumption as reported by the user correlate with consumption as reported by the VNO.

Example of Format and Content of Token

By way of example, a token may include one or more of the following information items:
Token Id: Identifier for the Token
IssuerId: Identifier for the Issuer
UserId: Identifier for the user
CreatedDate: Date of creation by the issuer
DataSizeMB: Amount of data represented by token
IssuerSignature: Signature from the Issuer for the above fields
RecipientNetworkId: Identifier for the visited network
AssignmentDate: Date of assignment from user to visited network
UserSignature: Signature from the User for the above fields
RedemptionDate: Date of redemption by visited network
Extensions:
MaxPrizePerMB: Maximum price to pay per MB It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units. The terms "processing circuitry" and "processor" may be used interchangeably in parts of this disclosure.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect, there is provided user equipment configured for operation in a wireless communication system.

The user equipment is configured to obtain at least one cryptographic token originating from a network node of a home network of the user equipment and cryptographically signed by a private key associated with the home network. The at least one cryptographic token represents means for accessing data communication services via user data transport functions of a visited network.

The user equipment is also configured to cryptographically sign the received and signed token by a private key associated with the user equipment to generate a double-signed token, and the user equipment is configured to send the double-signed token to a network node of the visited network for enabling the user equipment to access data communication services via the user data transport functions of the visited network.

By way of example, the user data transport functions may be provided by a Packet Data Network, PDN, Gateway, also referred to as a P-GW, in the visited network, and the user equipment may be configured for operation in the context of Local Breakout to enable data communication services for the user equipment via the P-GW in the visited network.

Alternatively, the user data transport functions may be provided by a User Plane Function, UPF, entity in the visited network, and the user equipment may be configured for operation in the context of Local Breakout to enable data communication services for the user equipment via the UPF entity in the visited network.

Figure 12:
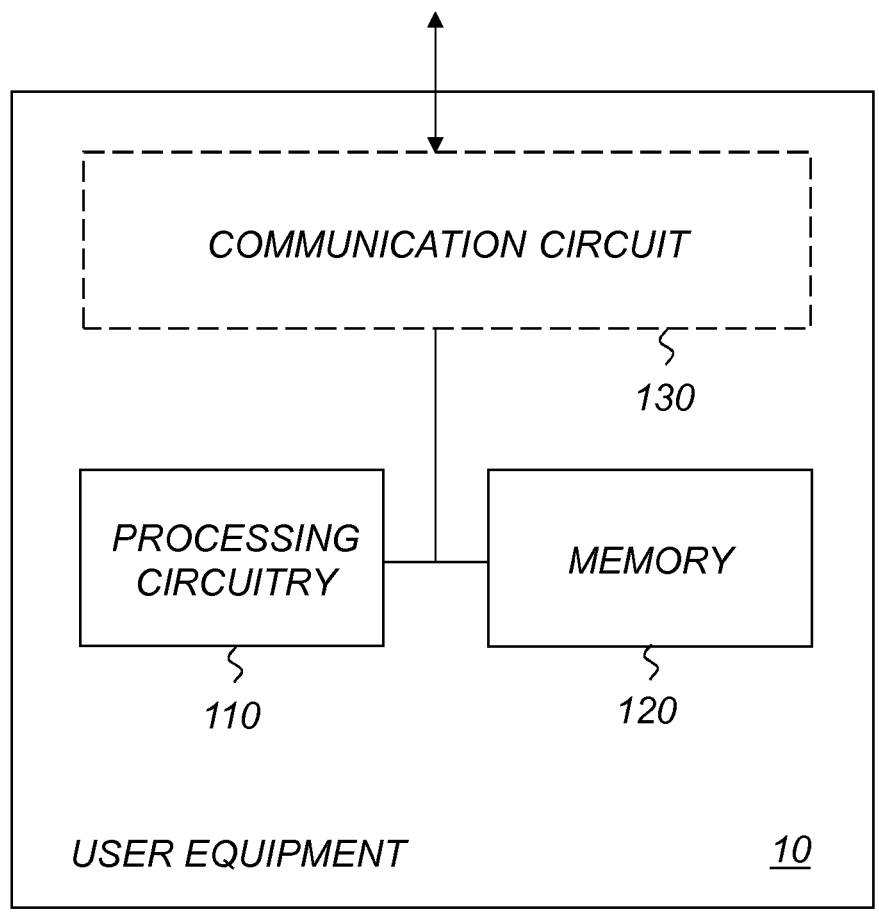
FIG. 12 is a schematic block diagram illustrating an example of user equipment according to an embodiment.

FIG. 12 is a schematic block diagram illustrating an example of user equipment according to an embodiment.

In this particular example, the user equipment system 10 comprises processing circuitry 110 including one or more processors and a memory 120, the memory 120 comprising instructions executable by the processing circuitry 110, whereby the processing circuitry is operative to perform at least some of the steps, actions and/or functions described herein, including the operations of the user equipment.

Optionally, the user equipment 10 may also include a communication circuit 130. The communication circuit 130 may include functions for wired and/or wireless communication with other devices and/or network nodes in the network. In a particular example, the communication circuit 130 may be based on radio circuitry for communication with one or more other nodes, including transmitting and/or receiving information. The communication circuit 130 may be interconnected to the processing circuitry 110 and/or memory 120. By way of example, the communication circuit 130 may include any of the following: a receiver, a transmitter, a transceiver, input/output (I/O) circuitry, input port(s) and/or output port(s).

For example, the functionality for handling the tokens may be implemented in a token handler or token client in the UE.

According to another aspect, there is provided a system for operation with a home network and configured to enable user equipment belonging to the home network to access data communication services in a visited network of a wireless communication system.

The system is configured to issue, to the user equipment, at least one cryptographic token representing means for accessing data communication services via user data transport functions of the visited network.

The system is also configured to cryptographically sign the cryptographic token by a private key associated with the home network.

Further, the system is configured to send the signed token to the user equipment and request the user equipment to cryptographically sign the signed token by a private key associated with the user equipment to generate a double-signed token for enabling the user equipment to access data communication services via the user data transport functions of the visited network when presenting the double-signed token to a network node of the visited network.

By way of example, the user data transport functions may be provided by a Packet Data Network, PDN, Gateway, also referred to as a P-GW, in the visited network, and the system may be configured for operation in the context of Local Breakout to enable data communication services for the user equipment via the P-GW in the visited network.

Alternatively, the user data transport functions may be provided by a User Plane Function, UPF, entity in the visited network, and the system may be configured for operation in the context of Local Breakout to enable data communication services for the user equipment via the UPF entity in the visited network.

Figure 13:
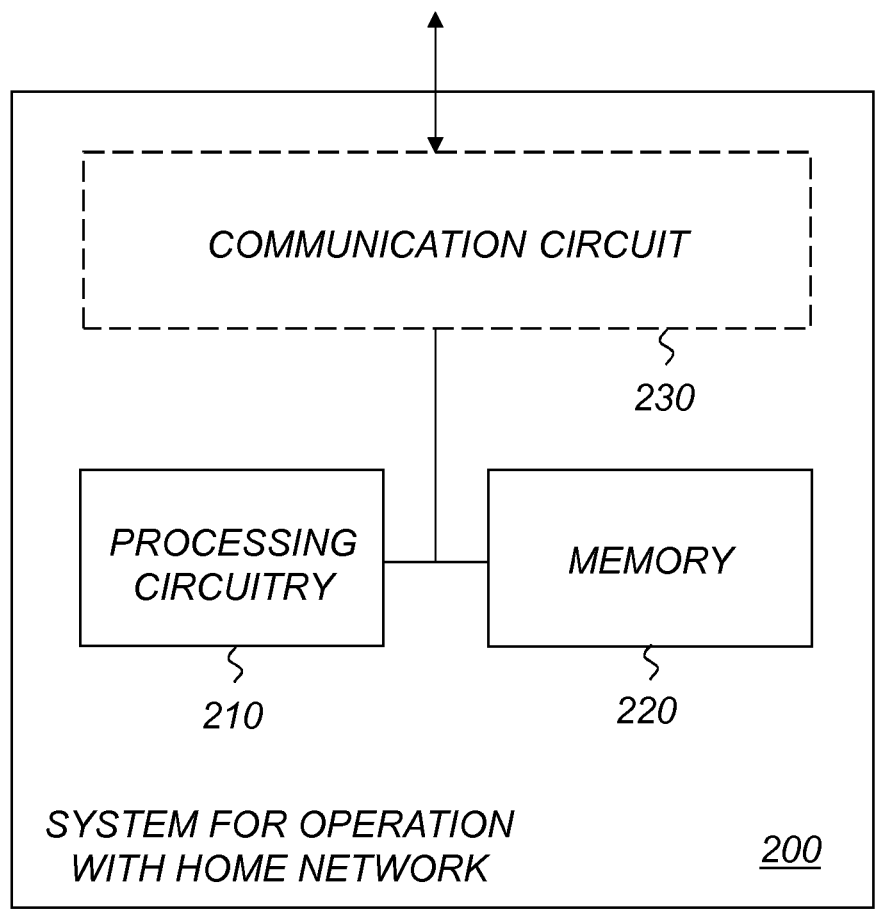
FIG. 13 is a schematic block diagram illustrating an example of a system for operation with a home network according to an embodiment.

FIG. 13 is a schematic block diagram illustrating an example of a system for operation with a home network according to an embodiment.

In this particular example, the system 200 comprises processing circuitry 210 including one or more processors and a memory 220, the memory 220 comprising instructions executable by the processing circuitry 210, whereby the processing circuitry is operative to perform at least some of the steps, actions and/or functions described herein, including operations of the system.

Optionally, the system 200 may also include a communication circuit 230. The communication circuit 230 may include functions for wired and/or wireless communication with other devices and/or network nodes in the network.

For example, the system may be implemented as a token managing server in the home network.

According to yet another aspect, there is provided a system for operation with a visited network and configured to enable user equipment belonging to a home network to access data communication services in the visited network of a wireless communication system.

The system is configured to obtain at least one cryptographic token from the user equipment that represents means for accessing data communication services via user data transport functions of the visited network. The at least one cryptographic token is a double-signed token cryptographically signed by a private key associated with the home network and cryptographically signed by a private key associated with the user equipment.

The system is further configured to validate the double-signed token for enabling the user equipment to access data communication services via the user data transport functions of the visited network.

By way of example, the user data transport functions may be provided by a Packet Data Network, PDN, Gateway, also referred to as a P-GW, in the visited network, and the system may be configured for operation in the context of Local Breakout to enable data communication services for the user equipment via the P-GW in the visited network.

Alternatively, the user data transport functions may be provided by a User Plane Function, UPF, entity in the visited network, and the system may be configured for operation in the context of Local Breakout to enable data communication services for the user equipment via the UPF entity in the visited network.

Figure 14:
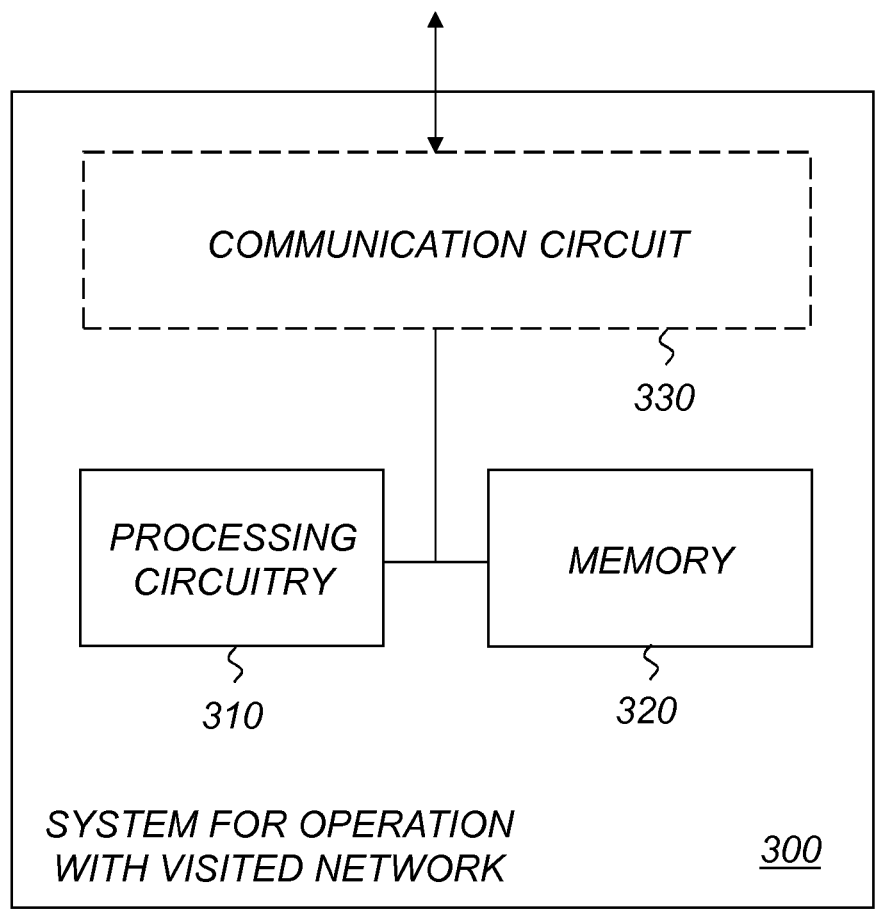
FIG. 14 is a schematic block diagram illustrating an example of a system for operation with a visited network according to an embodiment.

FIG. 14 is a schematic block diagram illustrating an example of a system for operation with a visited network according to an embodiment.

In this particular example, the system 300 comprises processing circuitry 310 including one or more processors and a memory 320, the memory 320 comprising instructions executable by the processing circuitry 310, whereby the processing circuitry is operative to perform at least some of the steps, actions and/or functions described herein, including operations of the system.

Optionally, the system 300 may also include a communication circuit 330. The communication circuit 330 may include functions for wired and/or wireless communication with other devices and/or network nodes in the network.

For example, the system may be implemented as a token managing server in the visited network.

In general, it is also possible to provide solutions based on a combination of hardware and software. The actual hardware-software partitioning can be decided by a system designer based on a number of factors including processing speed, cost of implementation and other requirements.

Figure 15:
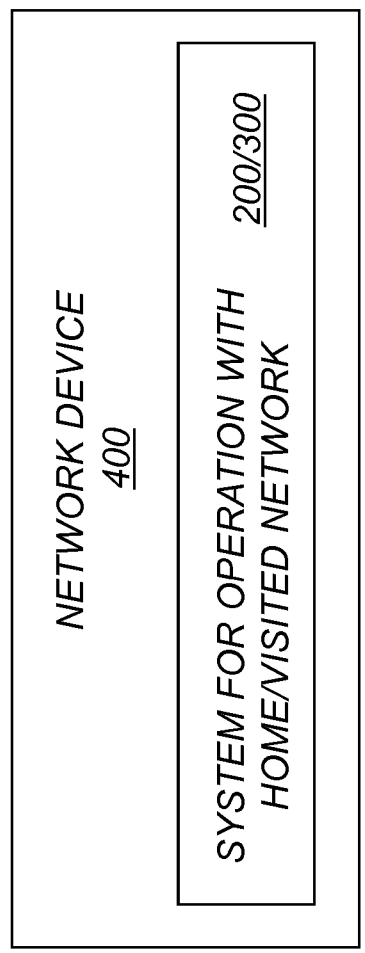
FIG. 15 is a schematic block diagram illustrating an example of a network device comprising a system for operation with a home/visited network according to an embodiment.

FIG. 15 is a schematic block diagram illustrating an example of a network device comprising a system for operation with a home/visited network according to an embodiment. In general, the network device 400 comprises a system for operation with a home/visited network 200/300. The network device may be any suitable network device in connection with the communication system(s). By way of example, the network device may be a suitable network node or an associated cloud-implemented network device.

Figure 16:
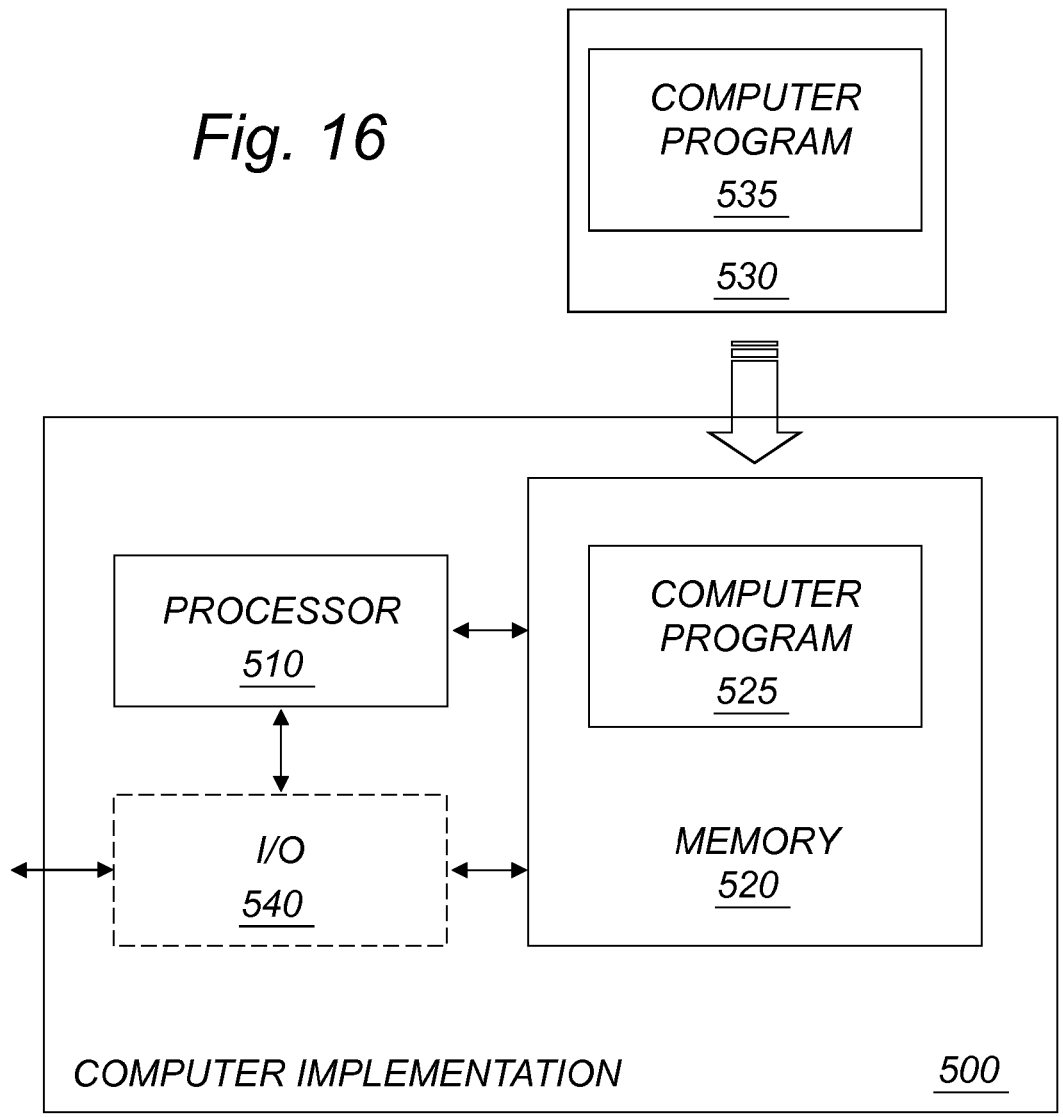
FIG. 16 is a schematic diagram illustrating an example of a computer-implementation according to an embodiment.

FIG. 16 is a schematic diagram illustrating an example of a computer-implementation according to an embodiment. In this particular example, at least some of the steps, functions, procedures, modules and/or blocks described herein are implemented in a computer program 525; 535, which is loaded into the memory 520 for execution by processing circuitry including one or more processors 510. The processor(s) 510 and memory 520 are interconnected to each other to enable normal software execution. An optional input/output device 540 may also be interconnected to the processor(s) 510 and/or the memory 520 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 510 is thus configured to perform, when executing the computer program 525, well-defined processing tasks such as those described herein.

The processing circuitry does not have to be dedicated to only execute the above-described steps, functions, procedure and/or blocks, but may also execute other tasks.

In a particular embodiment, there is provided a computer program 525; 535 for enabling, when executed, user equipment belonging to a home network to access data communication services in a visited network of a wireless communication system. The computer program 525; 535 comprises instructions, which when executed by at least one processor 510, cause the at least one processor 510 to:

obtain at least one cryptographic token originating from a network node of the home network of the user equipment and cryptographically signed by a private key associated with the home network, wherein said at least one cryptographic token represents means for accessing data communication services via user data transport functions of the visited network;

cryptographically sign the received and signed token by a private key associated with the user equipment to generate a double-signed token; and prepare a message including the double-signed token for sending to a network node of the visited network for enabling the user equipment to access data communication services via the user data transport functions of the visited network.

In another particular embodiment, there is provided a computer program 525; 535 for enabling, when executed, user equipment belonging to a home network to access data communication services in a visited network of a wireless communication system. The computer program comprises 525; 535 instructions, which when executed by at least one processor 510, cause the at least one processor 510 to:

obtain at least one cryptographic token from the user equipment that represents means for accessing data communication services via user data transport functions of the visited network, said at least one cryptographic token being a double-signed token cryptographically signed by a private key associated with the home network and cryptographically signed by a private key associated with the user equipment; and validate the double-signed token for enabling the user equipment to access data communication services via the user data transport functions of the visited network.

In yet another particular embodiment, there is provided a computer program 525; 535 for enabling, when executed, user equipment belonging to a home network to access data communication services in a visited network of a wireless communication system. The computer program 525; 535 comprises instructions, which when executed by at least one processor 510, cause the at least one processor 510 to:

issue, to the user equipment, at least one cryptographic token representing means for accessing data communication services via user data transport functions of the visited network;

cryptographically sign the cryptographic token by a private key associated with the home network; and prepare a message including the signed token for sending to the user equipment and requesting the user equipment to cryptographically sign the signed token by a private key associated with the user equipment to generate a double-signed token for enabling the user equipment to access data communication services via the user data transport functions of the visited network when presenting the double-signed token to a network node of the visited network.

According to another aspect, there is provided a computer-program product comprising a non-transitory computer-readable medium 520; 530 having stored thereon such a computer program 525; 535.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 525; 535 may be realized as a computer program product, which is normally carried or stored on a computer-readable medium 520; 530, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Alternatively it is possible to realize such module(s) predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

For example, the virtual apparatus may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

The term module or unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

It is also becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:
  Consolidation of network functionality into virtualized software running on customized or generic hardware. This is sometimes referred to as network function virtualization.
  Co-location of one or more application stacks, including operating system, running on separate hardware onto a single hardware platform. This is sometimes referred to as system virtualization, or platform virtualization.
  Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (Nis), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

The proposed technology is generally applicable for enabling user equipment belonging to a home network to access data communication services in a visited network of a wireless communication system, and especially for so-called Local Breakout.

The proposed technology may be applied to many specific applications and communication scenarios including communication within wired and/or wireless networks, securely providing various services within such networks, also including so-called Over-the-Top (OTT) services. For example, the proposed technology may enable and/or include transfer and/or transmission and/or reception of relevant user data and/or control data in wired and/or wireless communications, e.g. OTT services in roaming scenarios.

In the following, a set of illustrative non-limiting examples will now be described with reference to FIGS. 17-23.

Figure 17:
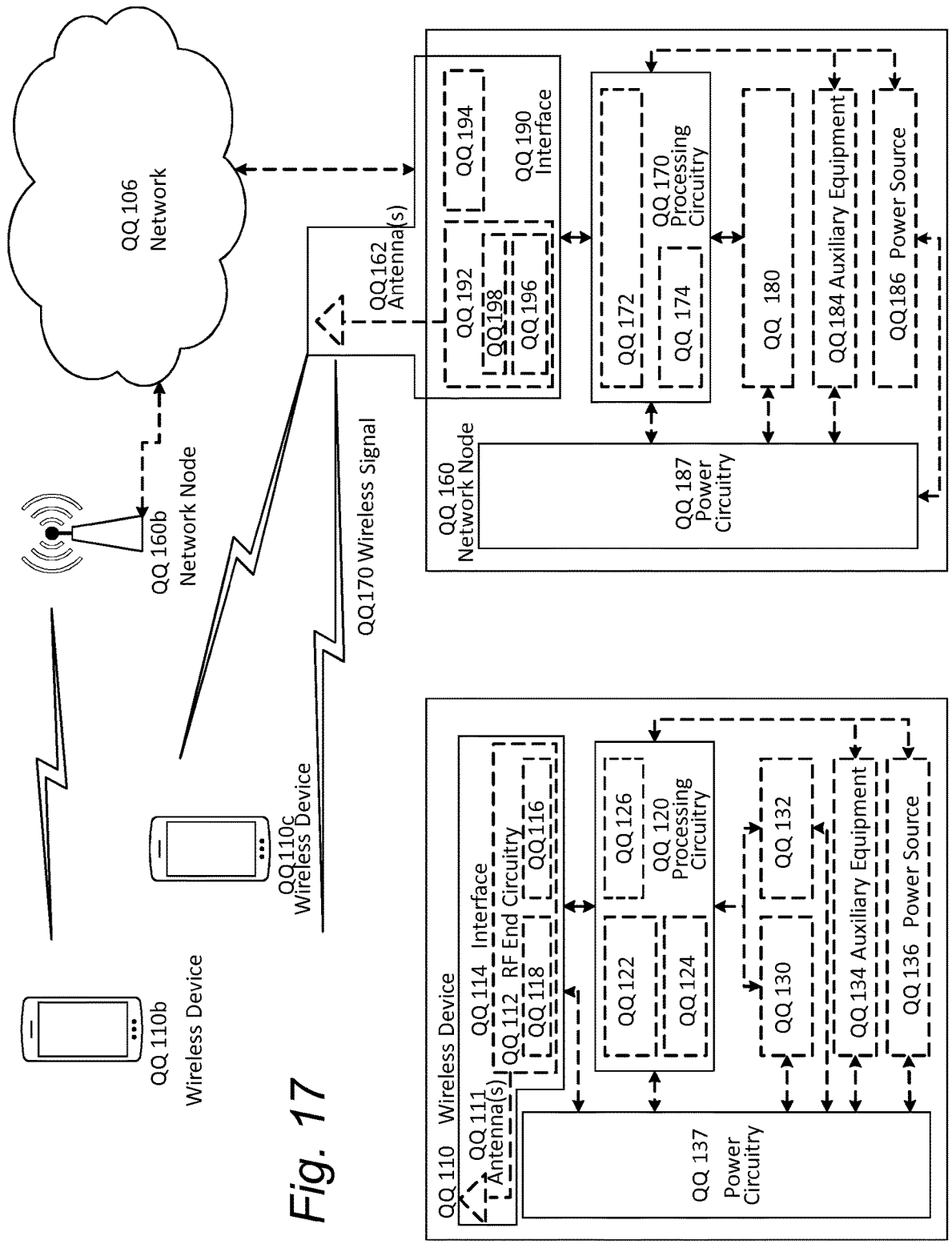
FIG. 17 is a schematic diagram illustrating an example of a wireless network in accordance with some embodiments.

FIG. 17 is a schematic diagram illustrating an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 17. For simplicity, the wireless network of FIG. 17 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 17, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 17 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, 5G/NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190.

In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used. Alternative embodiments of network node QQ160 may include additional components beyond those shown in FIG. 17 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). A vehicle-20 mounted wireless terminal device, etc. A WD may support device-to-device (D2D) communication, for example by implementing a 3GPP standard for sidelink communication, vehicle-to-vehicle (V2V), vehicleto-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal. As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, 5G/NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 18:
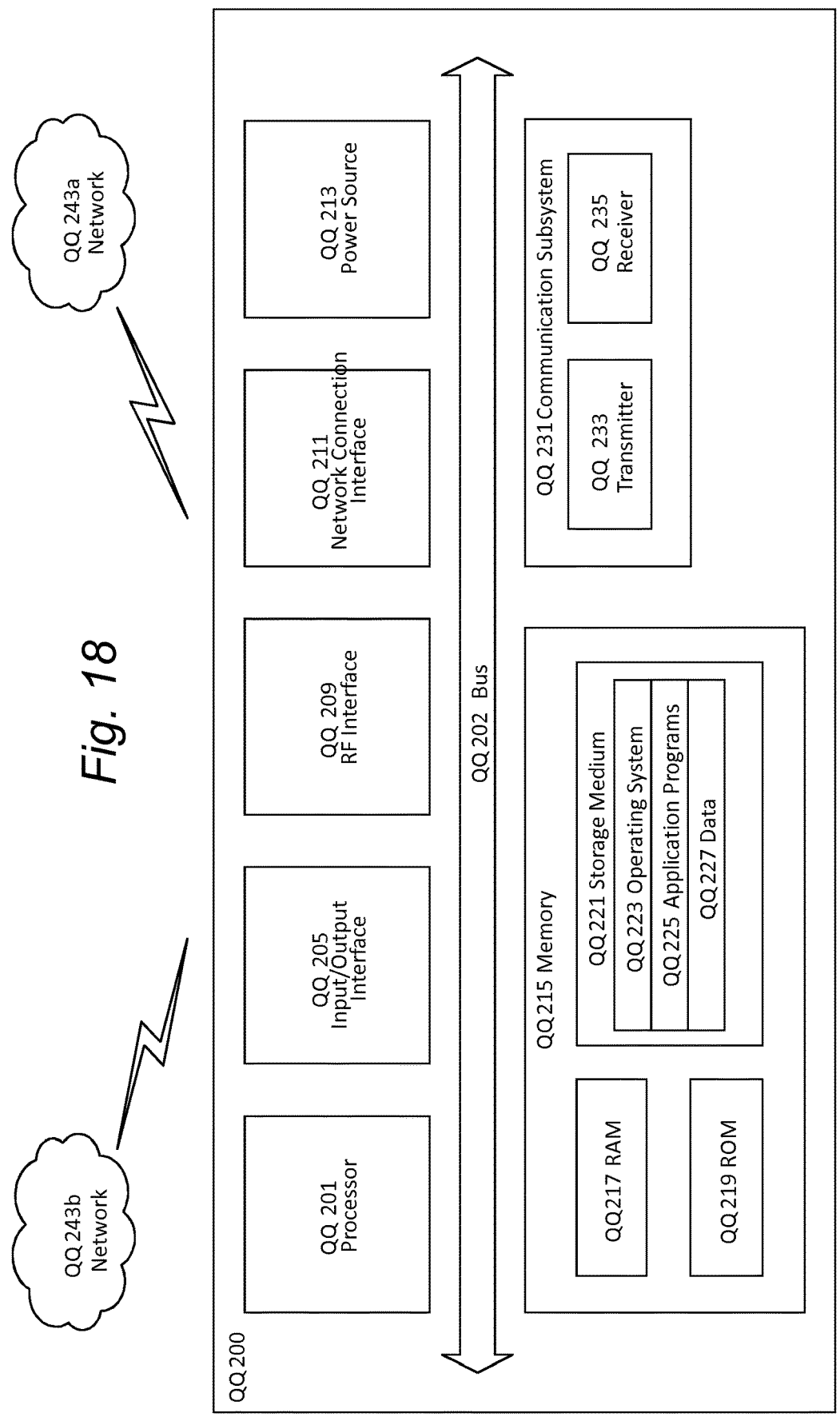
FIG. 18 is a schematic diagram illustrating an example of an embodiment of a UE in accordance with various aspects described herein.

FIG. 18 is a schematic diagram illustrating an example of an embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 18, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 18 is a UE, the components discussed herein are equally applicable to a WD, and vice-versa.

In FIG. 18, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 18, or only a subset of the components. The level of integration between the components may vary from one UE to another UE. Further, certain UEs may contain multiple instances of a component, such as multiple processors, memories, transceivers, transmitters, receivers, etc.

In FIG. 18, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 18, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 18, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 19:
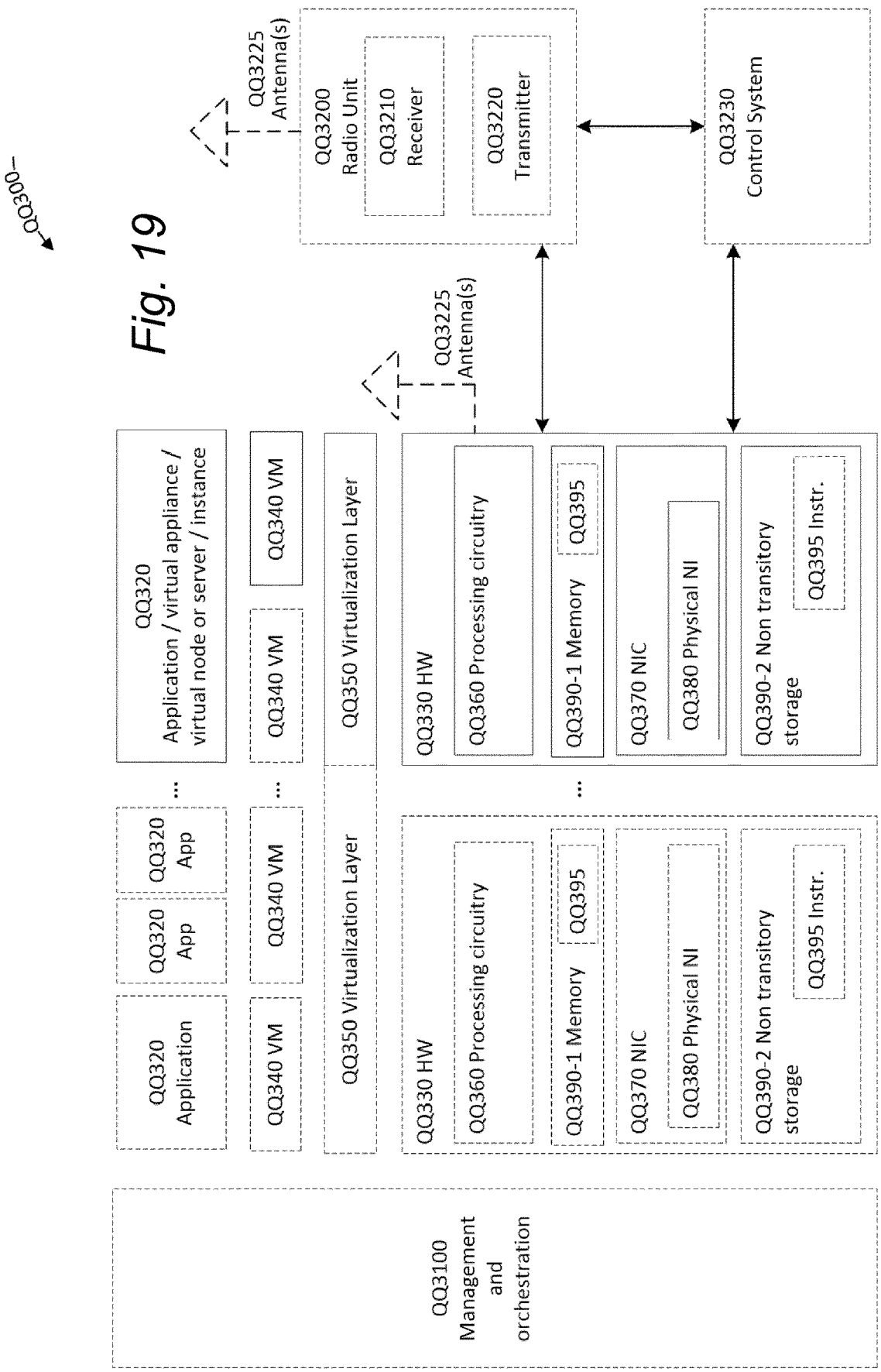
FIG. 19 is a schematic block diagram illustrating an example of a virtualization environment in which functions implemented by some embodiments may be virtualized.

FIG. 19 is a schematic block diagram illustrating an example of a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 19, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 19.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 20:
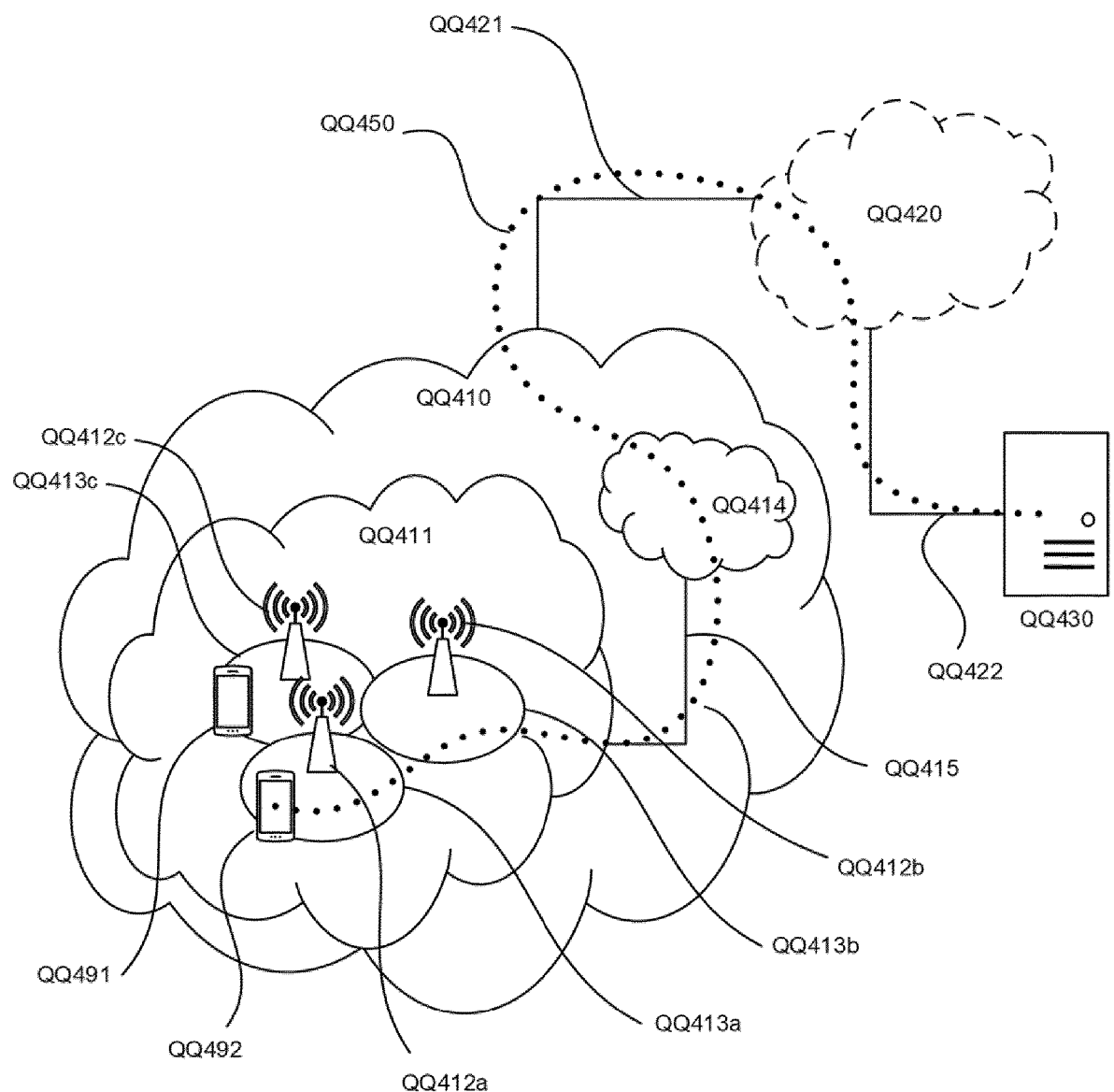
FIG. 20 is a schematic diagram illustrating an example of a telecommunication network connected via an intermediate network to a host computer in accordance with some embodiments.

FIG. 20 is a schematic diagram illustrating an example of a telecommunication network connected via an intermediate network to a host computer in accordance with some embodiments.

With reference to FIG. 20, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 20 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 21:
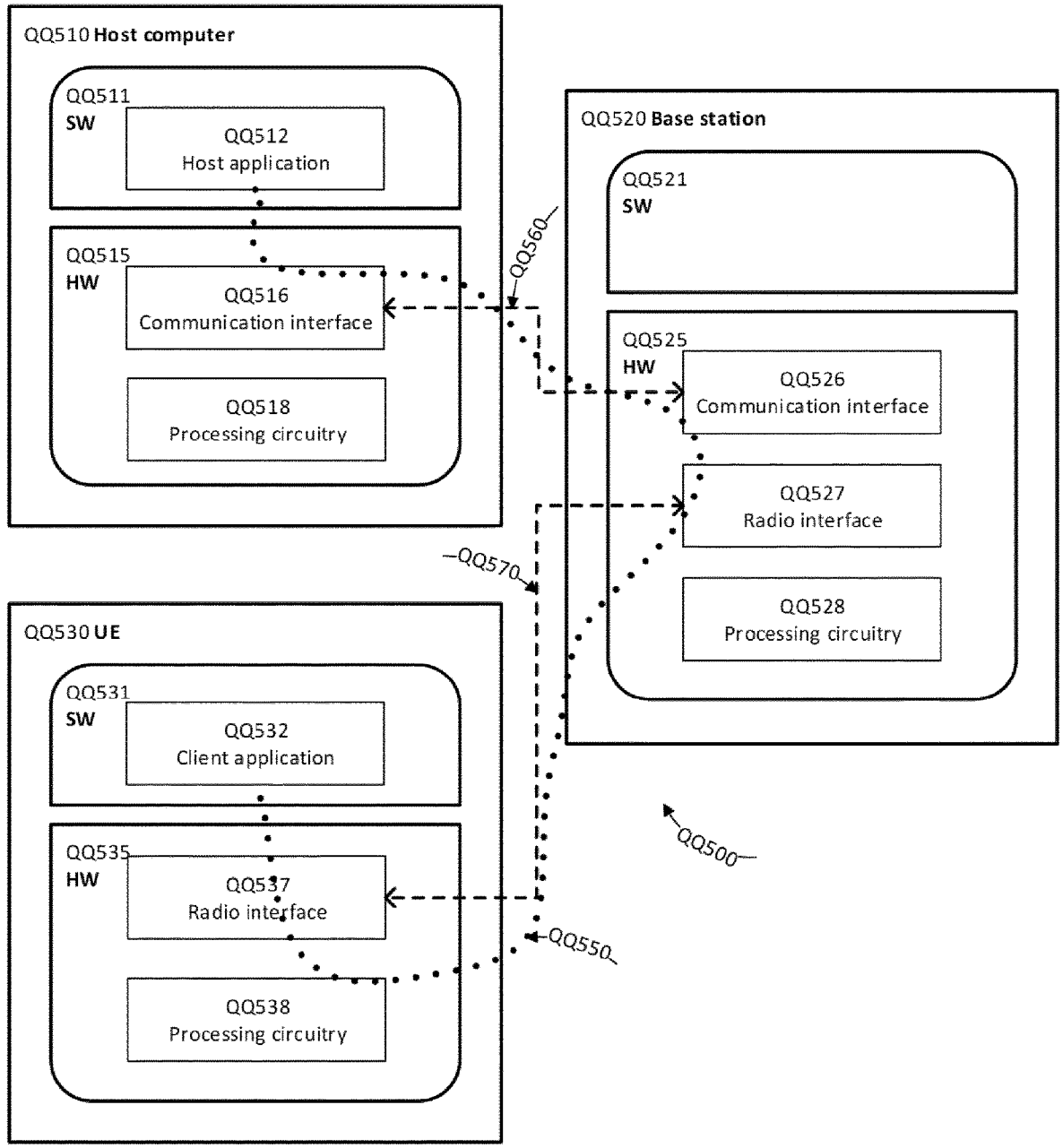
FIG. 21 is a schematic diagram illustrating an example of a host computer communicating via a base station with a user equipment over a partially wireless connection in accordance with some embodiments

FIG. 21 is a schematic diagram illustrating an example of a host computer communicating via a base station with a user equipment over a partially wireless connection in accordance with some embodiments Example implementations, in accordance with an embodiment, of the UE, base station and host computer discussed in the preceding paragraphs will now be described with reference to FIG. 21. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 21) served by base station QQ520. Communication interface QQ526 may be configured to facilitate connection QQ560 to host computer QQ510. Connection QQ560 may be direct or it may pass through a core network (not shown in FIG. 21) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. The hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 21 may be similar or identical to host computer QQ430, one of base stations QQ412a, QQ412b, QQ412c and one of UEs QQ491, QQ492 of FIG. 20, respectively. This is to say, the inner workings of these entities may be as shown in FIG. 21 and independently, the surrounding network topology may be that of FIG. 20.

In FIG. 21, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 22A:
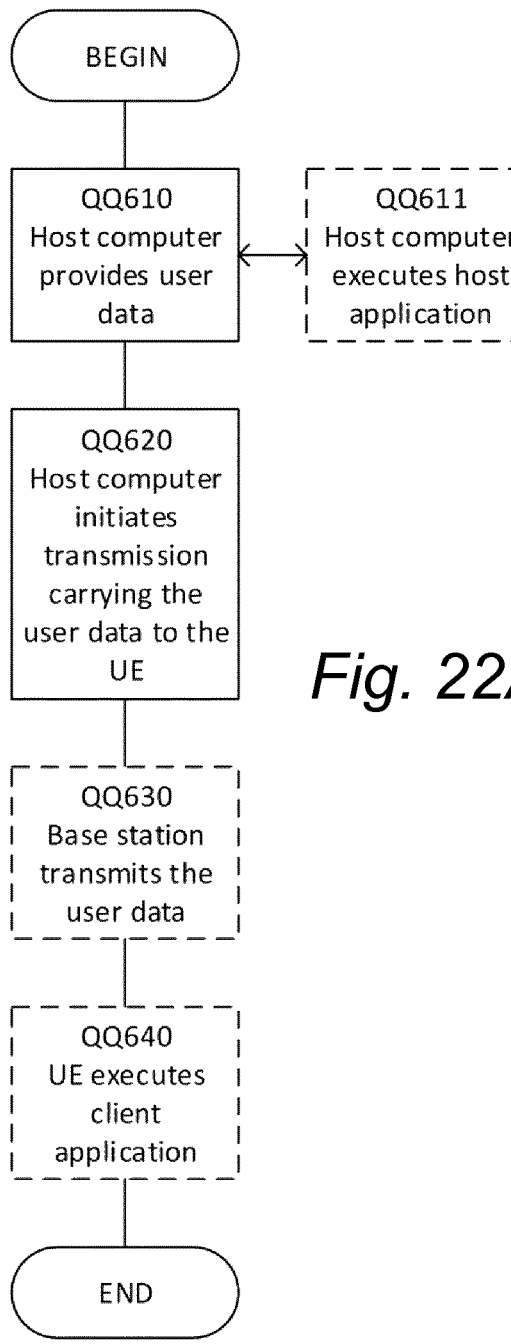
FIGS. 22A-B are schematic flow diagrams illustrating examples of methods implemented in a communication system including, e.g. a host computer, and optionally also a base station and a user equipment in accordance with some embodiments.
Figure 22B:
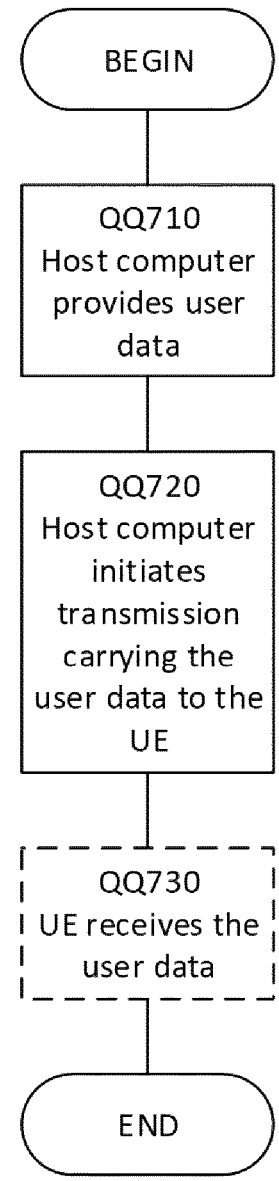

FIGS. 22A-B are schematic flow diagrams illustrating examples of methods implemented in a communication system including, e.g. a host computer, and optionally also a base station and a user equipment in accordance with some embodiments.

FIG. 22A is a flowchart illustrating a method implemented in a communication system, in accordance with one embodiment. The communication system includes a host computer, a base station and a UE which may be those described with reference to FIG. 20 and FIG. 21. For simplicity of the present disclosure, only drawing references to FIG. 22A will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 22B is a flowchart illustrating a method implemented in a communication system, in accordance with one embodiment. The communication system includes a host computer, a base station and a UE which may be those described with reference to FIG. 20 and FIG. 21. For simplicity of the present disclosure, only drawing references to FIG. 22B will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figures 23A, 23B:
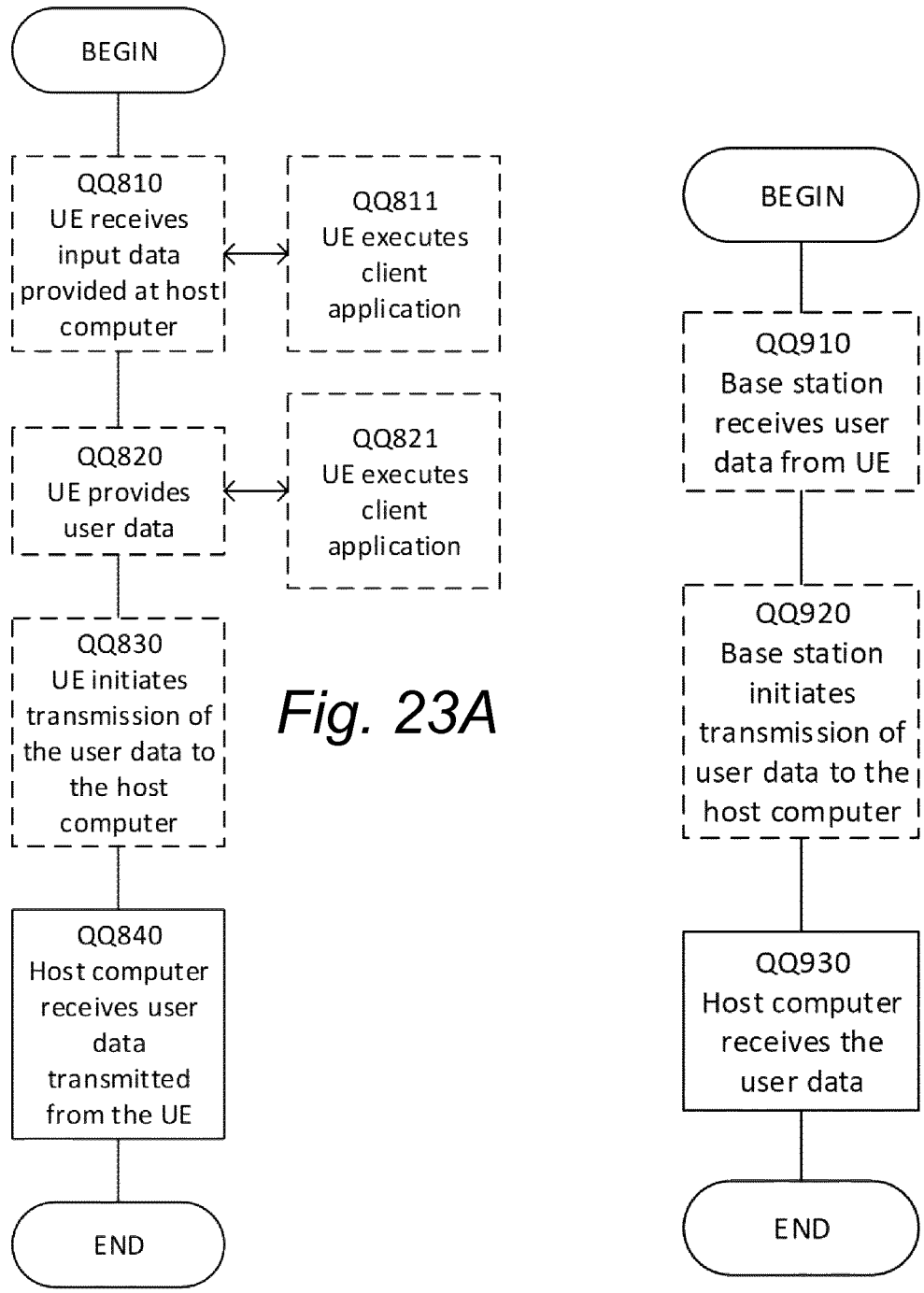
FIGS. 23A-B are schematic diagrams illustrating examples of methods implemented in a communication system including a host computer, a base station and a user equipment in accordance with some embodiments.

FIGS. 23A-B are schematic diagrams illustrating examples of methods implemented in a communication system including a host computer, a base station and a user equipment in accordance with some embodiments.

FIG. 23A is a flowchart illustrating a method implemented in a communication system, in accordance with one embodiment. The communication system includes a host computer, a base station and a UE which may be those described with reference to FIG. 20 and FIG. 21. For simplicity of the present disclosure, only drawing references to FIG. 23A will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 23B is a flowchart illustrating a method implemented in a communication system, in accordance with one embodiment. The communication system includes a host computer, a base station and a UE which may be those described with reference to FIG. 20 and FIG. 21. For simplicity of the present disclosure, only drawing references to FIG. 23B will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A method performed by user equipment belonging to a home network to access data communication services in a visited network of a wireless communication system, the method comprising:
  obtaining at least one cryptographic token originating from a network node of the home network of the user equipment and cryptographically signed by a private key associated with the home network, the at least one cryptographic token being usable for accessing data communication services via user data transport functions of the visited network and representing at least one of a predetermined or maximum data consumption limit, and a price range limitation;
  cryptographically signing the obtained and signed token by a private key associated with the user equipment to generate a double-signed token; and
  sending the double-signed token to a network node of the visited network for enabling the user equipment to access data communication services via the user data transport functions of the visited network.

2. The method of claim 1, wherein the user data transport functions are provided by a Packet Data Network, PDN, Gateway, also referred to as a P-GW, in the visited network, and the method is applied for Local Breakout to enable data communication services for the user equipment via the P-GW in the visited network, or
  wherein the user data transport functions are provided by a User Plane Function, UPF, entity in the visited network, and the method is applied for Local Breakout to enable data communication services for the user equipment via the UPF entity in the visited network.

3. The method of claim 1, wherein an identifier of the visited network is included in or associated to the token before the user equipment cryptographically signs the token.

4. A method performed by a network node to enable a user equipment belonging to a home network to access data communication services in a visited network of a wireless communication system, the method comprising:
  obtaining at least one cryptographic token from the user equipment that represents means for accessing data communication services via user data transport functions of the visited network and that represents at least one of a predetermined or maximum data consumption limit, and a price range limitation, the at least one cryptographic token being a double-signed token cryptographically signed by a private key associated with the home network and cryptographically signed by a private key associated with the user equipment; and
  validating the double-signed token for enabling the user equipment to access data communication services via the user data transport functions of the visited network.

5. The method of claim 4, wherein the user data transport functions are provided by a Packet Data Network, PDN, Gateway, also referred to as a P-GW, in the visited network, and the method is applied for Local Breakout to enable data communication services for the user equipment via the P-GW in the visited network, or
  wherein the user data transport functions are provided by a User Plane Function, UPF, entity in the visited network, and the method is applied for Local Breakout to enable data communication services for the user equipment via the UPF entity in the visited network.

6. The method of claim 4, wherein the double-signed token has cryptographic signatures generated by the private key associated with the home network and the private key associated with the user equipment, and the double-signed token is validated by verifying the cryptographic signatures based on a corresponding public key associated with the home network and a corresponding public key of the user equipment.

7. The method of claim 4, wherein the method further comprises sending a request for validation of at least one double-signed token to a network node of the home network to prevent double-spending of token(s).

8. The method of claim 4, wherein the method further comprises providing access for the user equipment to data communication services in the visited network according to the received and validated double-signed token, whereby the token is considered to be consumed.

9. The method of claim 8, wherein the method further comprises sending a request for redemption of a number of consumed tokens to a network node of the home network.

10. A method performed by a network node to enable a user equipment belonging to a home network to access data communication services in a visited network of a wireless communication system, the method comprising:
  issuing, to the user equipment, at least one cryptographic token usable for accessing data communication services via user data transport functions of the visited network and representing at least one of a predetermined or maximum data consumption limit, and a price range limitation;
  cryptographically signing the cryptographic token by a private key associated with the home network; and
  sending the signed token to the user equipment and requesting the user equipment to cryptographically sign the signed token by a private key associated with the user equipment to generate a double-signed token for enabling the user equipment to access data communication services via the user data transport functions of the visited network when presenting the double-signed token to a network node of the visited network.

11. The method of claim 10, wherein the user data transport functions are provided by a Packet Data Network, PDN, Gateway, also referred to as a P-GW, in the visited network, and the method is applied for Local Breakout to enable data communication services for the user equipment via the P-GW in the visited network, or
   wherein the user data transport functions are provided by a User Plane Function, UPF, entity in the visited network, and the method is applied for Local Breakout to enable data communication services for the user equipment via the UPF entity in the visited network.

12. The method of claim 10, wherein the method further comprises:
   receiving, from a network node of the visited network, a request for validation of at least one double-signed token; and
   validating and authorizing the use of the double-signed token to prevent double-spending of the token.

13. The method of claim 10, wherein the method further comprises:
   receiving a request for redemption of a number of consumed tokens from a network node of the visited network; and
   validating the consumed tokens as indicated in the request for redemption to enable compensation to be made to the visited network for consumed data communication services.

14. The method of claim 13, wherein the step of validating the consumed tokens is performed also based on user measurements of the corresponding data communication services.

15. A user equipment configured for operation in a wireless communication system, the user equipment comprising processing circuitry, configured to:
   obtain at least one cryptographic token originating from a network node of a home network of the user equipment and cryptographically signed by a private key associated with the home network, the least one cryptographic token being usable for accessing data communication services via user data transport functions of a visited network and representing at least one of a predetermined or maximum data consumption limit, and a price range limitation;
   the user equipment being configured to cryptographically sign the received and signed token by a private key associated with the user equipment to generate a double-signed token; and
   send the double-signed token to a network node of the visited network for enabling the user equipment to access data communication services via the user data transport functions of the visited network.

16. The user equipment of claim 15, wherein the user data transport functions are provided by a Packet Data Network, PDN, Gateway, also referred to as a P-GW, in the visited network, and the user equipment is configured for operation in the context of Local Breakout to enable data communication services for the user equipment via the P-GW in the visited network, or
   wherein the user data transport functions are provided by a User Plane Function, UPF, entity in the visited network, and the user equipment is configured for operation in the context of Local Breakout to enable data communication services for the user equipment via the UPF entity in the visited network.

17. The user equipment of claim 15, wherein the user equipment—comprises processing circuitry and memory, the memory comprising instructions executable by the processing circuitry, whereby the processing circuitry is operative to perform operations of the user equipment.

18. A system for operation with a home network, the system being configured to enable user equipment belonging to the home network to access data communication services in a visited network of a wireless communication system, the system being further configured to:
   issue, to the user equipment, at least one cryptographic token usable for accessing data communication services via user data transport functions of the visited network and representing at least one of a predetermined or maximum data consumption limit, and a price range limitation;
   cryptographically sign the cryptographic token by a private key associated with the home network; and
   send the signed token to the user equipment and request the user equipment to cryptographically sign the signed token by a private key associated with the user equipment to generate a double-signed token for enabling the user equipment to access data communication services via the user data transport functions of the visited network-when presenting the double-signed token to a network node of the visited network.

19. A system for operation with a visited network, the system being configured to enable user equipment belonging to a home network to access data communication services in the visited network of a wireless communication system, the system being further configured to:
   obtain at least one cryptographic token from the user equipment, the at least one cryptographic token being usable for accessing data communication services via user data transport functions of the visited network and representing at least one of a predetermined or maximum data consumption limit, and a price range limitation and being a double-signed token cryptographically signed by a private key associated with the home network and cryptographically signed by a private key associated with the user equipment; and
   validate the double-signed token for enabling the user equipment to access data communication services via the user data transport functions of the visited network.

20. The system of claim 18, wherein the user data transport functions are provided by a Packet Data Network, PDN, Gateway, also referred to as a P-GW, in the visited network, and the system is configured for operation in the context of Local Breakout to enable data communication services for the user equipment via the P-GW in the visited network, or
   wherein the user data transport functions are provided by a User Plane Function, UPF, entity in the visited network, and the system is configured for operation in the context of Local Breakout to enable data communication services for the user equipment via the UPF entity in the visited network.

21. The system of claim 18, wherein the system comprises processing circuitry and memory, the memory comprising instructions executable by the processing circuitry, whereby the processing circuitry is operative to perform operations of the system.

* * * * *